(12) United States Patent
Khankal et al.

(10) Patent No.: US 11,254,761 B1
(45) Date of Patent: Feb. 22, 2022

(54) CATALYST PRETREATMENT AND FEEDING SYSTEM FOR POLYPROPYLENE PRODUCTION

(71) Applicant: Chevron Phillips Chemical Company LP, The Woodlands, TX (US)

(72) Inventors: Reza Khankal, Humble, TX (US); Joel A. Mutchler, Porter, TX (US); Bryan M. Garner, Alvin, TX (US); James E. Hein, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/071,527

(22) Filed: Oct. 15, 2020

(51) Int. Cl.
*C08F 10/06* (2006.01)

(52) U.S. Cl.
CPC .................. *C08F 10/06* (2013.01)

(58) Field of Classification Search
CPC ....................................................... C08F 10/06
USPC ................................................................ 526/66
See application file for complete search history.

(56) References Cited

U.S. PATENT DOCUMENTS

| | | | |
|---|---|---|---|
| 4,767,735 A | 8/1988 | Ewen | |
| 4,923,833 A | 5/1990 | Kioka | |
| 5,122,583 A | 6/1992 | Ewen | |
| 5,283,278 A | 2/1994 | Daire | |
| 6,040,260 A | 3/2000 | Pentti | |
| 7,652,108 B2 | 1/2010 | Mei | |
| 7,741,420 B2 | 6/2010 | Brant | |
| 7,799,882 B2 | 9/2010 | Jiang | |
| 2004/0044148 A1* | 3/2004 | Bidell | C08F 10/00 526/64 |
| 2010/0125124 A1 | 5/2010 | Blackmon | |
| 2011/0174415 A1 | 7/2011 | Leskinen | |

FOREIGN PATENT DOCUMENTS

| | | |
|---|---|---|
| EP | 0279153 B1 | 3/1994 |
| EP | 2216347 A1 | 8/2010 |
| EP | 2109498 B1 | 11/2016 |
| EP | 2009032 B1 | 7/2017 |
| WO | 2008022900 A1 | 2/2008 |
| WO | 2009010413 A1 | 1/2009 |

* cited by examiner

*Primary Examiner* — William K Cheung
(74) *Attorney, Agent, or Firm* — Conley Rose, P.C.

(57) ABSTRACT

A process and system for pre-polymerizing propylene are disclosed. A first catalyst suspension is formed by mixing catalyst particles with a hydrocarbon that is a saturated hydrocarbon or propylene. Various other catalyst components are added to the first catalyst suspension, and the first catalyst suspension is then pre-polymerized under pre-polymerization conditions to form a pre-polymerized catalyst suspension that is introduced to a polymerization reactor or a storage tank. The saturated hydrocarbon can be propane, mixed butanes, or mixture thereof.

20 Claims, 8 Drawing Sheets

CATALYST PRETREATMENT AND FEEDING SYSTEM FOR POLYPROPYLENE PRODUCTION

TECHNICAL FIELD

The present disclosure relates to the polymerization of propylene, and particularly, to the dilution and pre-polymerization of catalyst used for polymerization of propylene.

BACKGROUND

Polypropylene can be prepared by polymerization of propylene in one or more reactors in which feed materials such as monomer, comonomer, catalyst, activator, chain transfer agent, and catalyst diluent are introduced. The polymerization reaction within the reactor yields polypropylene as part of a polymerization product. The propylene can be recovered, and remaining portions of the polymerization product (e.g., unreacted propylene, unreacted comonomer, and catalyst diluent) can be further processed, typically downstream from the reactor in monomer recovery systems. The polypropylene can be a homopolymer, random copolymer, or block copolymer.

In some cases, catalysts used in propylene polymerization can be mixed with a carrier fluid for transport to a polymerization reactor. Also, propylene can be pre-polymerized to produce polypropylene particles that are then fed to a polymerization reactor. The carrier fluid for the catalyst that is fed to the reactor and that is fed to a pre-polymerization system is a cost in propylene polymerization. Moreover, as the size of commercial polypropylene manufacturing plants increases to meet global demand, so does the demand for these carrier fluids, and alternative carrier fluid sources are desirable for various reasons including to obtain stable supply, to reduce operating cost, and to simplify plant design.

SUMMARY

Disclosed is a process for pre-polymerizing propylene that includes adding a catalyst and a hydrocarbon to a first mixer; mixing the catalyst and the hydrocarbon in the first mixer to form a first catalyst suspension comprising the catalyst and the hydrocarbon; flowing the first catalyst suspension from the first mixer to a second mixer; adding a co-catalyst and an optional electron donor agent to the first catalyst suspension in or upstream of the second mixer; pre-polymerizing propylene in the second mixer to form a second catalyst suspension comprising the hydrocarbon and catalyst particles coated with polypropylene; and flowing the second catalyst suspension to a polymerization reactor or to a storage tank.

Also disclosed herein a pre-polymerization system that includes a first feed line comprising a catalyst; a first mixer having a first inlet connected to the first feed line; a first transfer line containing a first catalyst suspension and having an end connected to an outlet of the first mixer; a second mixer having an inlet connected to an opposite end of the first transfer line, wherein the second mixer is configured to pre-polymerize propylene in a presence of the catalyst to produce a coating of polypropylene on catalyst particles received from the first transfer line; a second feed line comprising a co-catalyst, wherein the second feed line is connected to the first transfer line or to a second inlet of the second mixer; an optional third feed line comprising an electron donor agent, wherein the optional third feed line is connected to the first transfer line or to a third inlet of the second mixer; a second transfer line having an end connected to an outlet of the second mixer; and a polymerization reactor coupled to an opposite end of the second transfer line, wherein the polymerization reactor is configured to polymerize propylene in a presence of the catalyst particles having the coating of polypropylene to produce a product polypropylene.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
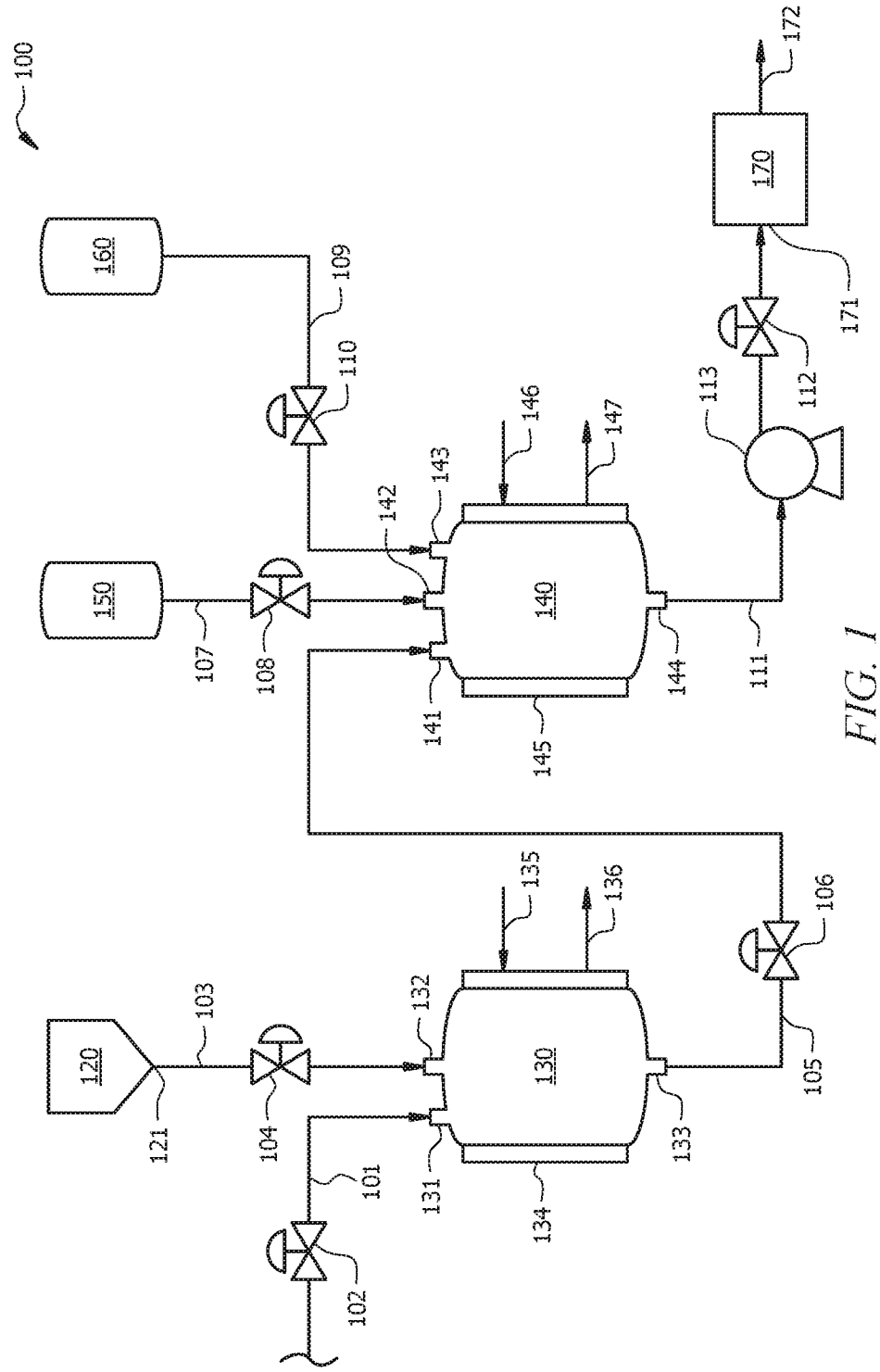
FIG. 1 illustrates a process flow diagram of an embodiment of a continuous pre-polymerization system.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "up," "down," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in a disclosed system or process. For example, unless otherwise specified, a particular structure "configured for use" means it is "configured for use in an olefin polymerization system" and therefore is designed, shaped, arranged, constructed, and/or tailored to effect an olefin polymerization, as would have been understood by the skilled person.

The terms "conduit" and "line" are interchangeable, and as used herein, refer to a physical structure configured for the flow of materials therethrough, such as pipe or tubing. The materials that flow in the "conduit" or "line" can be in the gas phase, the liquid phase, the solid phase, or a combination of these phases.

The term "stream" as used herein refers to a physical composition of materials that flow through a "conduit" or "line".

The terms "pre-polymerization" and "pre-polymerizing" as used herein refer to conditions of polymerization that are performed to achieve a lower reaction rate and monomer conversion, as compared with the reaction rate and monomer conversion achieved under normal polymerization conditions. The purpose of pre-polymerization is to affect the bulk properties and improve reactor operability. Bulk properties include average particle size, fines, and bulk density. Reaction rate can be lowered by adjusting the reactor temperature, concentration of comonomer, and alkyl concentration.

The term "mixed butanes" as used herein refers to a mixture of n-butane and isobutane. An exemplary stream of "mixed butanes" includes at least about 94 vol % n-butane and less than about 6 vol % isobutane.

Disclosed herein are systems and processes for pre-polymerizing a catalyst for use in the polymerization of propylene. The systems and processes involve using propylene, propane, n-butane, mixed butanes, or a combination thereof as a catalyst carrier and as a diluent during pre-polymerization of the catalyst. The disclosed system and process may be performed on a batch or continuous basis. The pre-polymerized catalyst can then be introduced into a reactor configured for the polymerization of propylene. Use of propylene as the catalyst carrier and pre-polymerization diluent simplifies the hydrocarbon separations after recovery from the polymerization product (recovered from the polymerization reactor) because propylene used as diluent can be isolated under the same conditions that unreacted propylene is isolated. Use of propane, n-butane, mixed butanes, or combinations thereof as the catalyst carrier and pre-polymerization diluent i) provides an option for propylene polymerization systems and processes that have a limited availability of isobutane or would like to reduce the cost of the carrier diluent since n-butane and mixed butanes have a lower cost than isobutane, ii) reduce the size of or eliminate the need for equipment related to isobutane feed, treatment, storage, and recovery, and iii) improves monomer efficiency since less propylene will be lost in the hydrocarbon separations due to the higher boiling point for the n-butane (as compared to isobutane).

Turning now to the figures, FIGS. 1-8 illustrate process flow diagrams of embodiments of pre-polymerization systems 100, 200, 300, 400, 500, 600, 700, and 800. Aspects and embodiments of each system 100, 200, 300, 400, 500, 600, 700, and 800 are described below.

FIG. 1 illustrates a process flow diagram of an embodiment of a pre-polymerization system 100. The system 100 in FIG. 1 utilizes propylene as the diluent for the catalyst. Two mixing vessels are utilized, a first mixer 130 and a second mixer 140 coupled to one another by the various lines that are configured to transport the catalyst suspension and introduce co-catalyst and an optional electron donor agent for pre-polymerization of propylene in the second mixer 140.

In the system 100 of FIG. 1, propylene is fed to the first mixer 130 via feed line 101. The feed line 101 has an end connected to the inlet 131 of the first mixer 130. A control valve 102 can be included in feed line 101 and configured to control the amount of propylene that is introduced into the first mixer 130 via the inlet 131. In some embodiments, the control valve 102 can be an actuator valve that opens and closes to allow and disallow a flow of propylene in feed line 101. In other embodiments, the control valve 104 can be a throttling valve that can control the size of the orifice that is open for flow of propylene through the valve 102. The control valve 102 can be controlled by any controller known in the art with the aid of this disclosure. The propylene in feed line 101 can be in liquid phase and comprise greater than 90, 91, 92, 93, 94, 95, 96, 97, 98, or 99 wt % of the contents of the feed line 101 based on a total weight of contents in the feed line 101, with the remainder of components in the feed line 101 being liquid hydrocarbons other than propylene. In an embodiment, the feed line 101 can contain about 100 wt % propylene based on a total weight of the contents in the feed line 101.

A catalyst hopper 120 contains catalyst particles that are introduced into the first mixer 130 via feed line 103. The feed line 103 has an end connected to an outlet 121 of the catalyst hopper 120 and an opposite end connected to the inlet 132 of the first mixer 130. The catalyst particles are solid particles of the catalyst used for polymerization of propylene. The catalyst particles can include solid particles of Ziegler-Natta catalyst, metallocene catalyst, or a combination of Ziegler-Natta and metallocene catalysts, for example. In some aspects, the solid catalyst particles may include the catalyst(s) associated with a support material (e.g., silica, alumina, titania, $MgCl_2$, or combinations thereof). A control valve 104 can be included in feed line 103 to regulate the flow of catalyst particles from the catalyst hopper 120 into the first mixer 130. In some embodiments, the control valve 104 can be a cycling valve that meters the amount of catalyst particles that flow in feed line 103 to the first mixer 130. In other embodiments, the control valve 104 can be an actuator valve that opens and closes to allow and disallow a flow of catalyst particles in feed line 103. In yet other embodiments, the control valve 104 can be a throttling valve that can control the size of the orifice that is open for flow of catalyst particles through the valve 104. The control valve 104 can be controlled by any controller known in the art with the aid of this disclosure.

In some aspects, the inlets 131 and 132 can be embodied as a single inlet for the first mixer 130, and feed lines 101 and 103 can be configured to combine into a single feed line which is connected to the single inlet for the first mixer 130.

The first mixer 130 is configured to mix propylene and solid catalyst particles to form a catalyst suspension for transport in the pre-polymerization system 100. The first mixer 130 can be embodied as any vessel that is suitable for mixing catalyst suspensions, and particularly, for mixing catalyst suspensions that are used for the polymerization of propylene, e.g., for introduction to a loop slurry reactor or a gas phase reactor. The vessel can generally be cylindrical in shape. The top and bottom of the vessel can be flat, or can have a contour that is appropriate for holding pressurized contents, e.g., at a pressure suitable for coupling with a polymerization reactor. In some embodiments, the first mixer 130 can have a stirrer extending within the vessel such that the first mixer 130 is a continuous stirred tank. In some aspects, the height of the first mixer 130 can be 5-20 feet; alternatively, or 8-12 feet; or alternatively, 9-10 feet as measured tangent to tangent. In some aspects, the diameter of the first mixer 130 can be 2-20 feet; alternatively, 3-12 feet; alternatively, 4-10 feet; alternatively, 4-5 feet; or alternatively, 9-10 feet.

The temperature of the first mixer 130 can be controlled by heat exchange jackets 134 on the walls of the first mixer 130 that circulate coolant or refrigerant therethrough (e.g., via coolant/refrigerant input and output lines 135 and 136) to control the temperature of the contents of the first mixer 130 to a temperature in the range of from about 0° C. to about 10° C.; alternatively, from about 2° C. to about 7° C.; alternatively, from about 3° C. to about 6° C.; alternatively, about 5° C. In alternative embodiments, the temperature of the first mixer 130 can be controlled by an external heat exchange circulation loop coupled to the first mixer 130 that removes a portion of the catalyst suspension and cools the suspension in a heat exchanger before passing the cooled suspension back to the first mixer 130, or by any other heat exchange mechanism known in the art with the aid of this disclosure.

A transfer line 105 has an end connected to an outlet 133 of the first mixer 130 and an opposite end connected to an inlet 141 of the second mixer 140. The transfer line 105 is configured to transport the catalyst suspension from the first mixer 130 to the second mixer 140. Limited polymerization of propylene may occur in line 105 because of the low temperature controlled in the first mixer 130 and because the co-catalyst and optional electron donor agent are not present in line 105. A control valve 106 can be included in transfer line 105 to regulate the flow of catalyst suspension from the first mixer 130 to the second mixer 140. In some embodiments, the control valve 106 can be an actuator valve that opens and closes to allow and disallow a flow of catalyst suspension in transfer line 105. In other embodiments, the control valve 106 can be a throttling valve that can control the size of the orifice that is open for flow of catalyst suspension through the valve 106. The control valve 106 can be controlled by any controller known in the art with the aid of this disclosure.

In aspects of the system 100 of FIG. 1, co-catalyst can be fed to the second mixer 140 via feed line 107. It is recognized that in some aspects, the co-catalyst may not be needed in order to affect pre-polymerization of propylene in the system 100, while in other aspects, co-catalyst is required to affect pre-polymerization of propylene to a level that is adequate for propylene to be considered pre-polymerized within the disclosed of this disclosure. In aspects where co-catalyst is required for pre-polymerization to adequate levels, the feed line 107 can have an end connected to a co-catalyst source 150 and an opposite end connected to an inlet 142 of the second mixer 140. Suitable co-catalyst include, but are not limited to, aluminoxane compounds, organoboron or organoborate compounds, ionizing ionic compounds, organoaluminum compounds, organozinc compounds, organomagnesium compounds, organolithium compounds, or combinations thereof. Examples of organoaluminum compounds include trialkylaluminum, trialkyloxyaluminum, alkylaluminum dihalide, and dialkylaluminum halide in which the halogen component is provided by chlorine, bromine or iodine. An example of trialkylaluminum compound is triethylaluminum. A control valve 108 can be included in feed line 107 to regulate the flow of co-catalyst from the co-catalyst source 150 to the second mixer 140. In some embodiments, the control valve 108 can be an actuator valve that opens and closes to allow and disallow a flow of co-catalyst in feed line 107. In other embodiments, the control valve 108 can be a throttling valve that can control the size of the orifice that is open for flow of co-catalyst through the valve 108. The control valve 108 can be controlled by any controller known in the art with the aid of this disclosure.

In some aspects of the system 100 of FIG. 1, an electron donor agent optionally can be fed to the second mixer 140 via feed line 109. When electron donor agent is utilized in the system 100, the feed line 109 can have an end connected to the electron donor agent source 160 and an opposite end connected to an inlet 143 of the second mixer 140. Electron donors can include amines, amides, ethers, ketones, nitriles, phosphines, stibines, arsines, phosphoramides, thioethers, thioesters, aldehydes, alcoholates, amides, silanes, and salts of organic acids. Examples of suitable esters include esters of carboxylic, alkoxy or amino acids, and esters of aromatic acids. An example of a silane compound is diphenyl dimethoxy silane. A control valve 110 can be included in feed line 109 to regulate the flow of electron donor agent from the electron donor agent source 160 to the second mixer 140. In some embodiments, the control valve 110 can be an actuator valve that opens and closes to allow and disallow a flow of electron donor agent in feed line 109. In other embodiments, the control valve 110 can be a throttling valve that can control the size of the orifice that is open for flow of electron donor agent through the valve 110. The control valve 110 can be controlled by any controller known in the art with the aid of this disclosure.

In aspects of the disclosure, the electron donor agent and be introduced in the pre-polymerization system 100 upstream of the polymerization reactor 170; alternatively, the electron donor agent can be introduced to the polymerization reactor 170; or alternatively, the electron donor agent can be introduced into both the pre-polymerization system 100 upstream of the polymerization reactor 170 and to the polymerization reactor 170.

In some aspects, the inlets 141, 142, and 143 can be embodied as two inlets or a single inlet for the second mixer 140. For example, the second mixer 140 may include only inlets 141 and 142. In such embodiments, feed lines 107 and 109 can be configured to combine into a combined feed line that is connected to inlet 142, while the transfer line 105 is connected to the inlet 141. In other embodiments, the transfer line 105 and feed lines 107 and 109 can be configured to combine into a combined feed line that is connected to a single inlet for the second mixer, e.g., inlet 141.

The second mixer 140 is configured to operate under conditions that pre-polymerize propylene in the presence of the catalyst contained in/on the catalyst particles such that a coating of polypropylene is produced on the solid catalyst particles. The reaction conditions (e.g., one or more of pressure, temperature, residence time, catalyst particle concentration in the propylene, co-catalyst concentration in the propylene, and electron donor agent concentration in the propylene) of the catalyst suspension within the second mixer 140 may be controlled to have a lower temperature and/or lower polymerization rate, as compared to a polymerization reactor 170, to allow the pre-polymer particles to form without exceeding a pre-polymer particle size that would foul any downstream lines (e.g., line 111) and/or downstream equipment (e.g., pump 113, valve 112, inlet 171). In some aspects, the reaction conditions that are controlled in the second mixer 140 for pre-polymerization of propylene are co-catalyst concentration in the propylene, electron donor agent concentration in the propylene, temperature, and residence time of the catalyst suspension in the second mixer 140. The pressure in the second mixer 140 can be controlled by a supply of inert gas or other pressure control mechanism known in the art with the aid of this disclosure.

The pre-polymerization reaction is an exothermic reaction, so temperature control generally involves the removal of the heat of reaction to maintain the temperature of the catalyst suspension in the second mixer 140. The temperature of the second mixer 140 can be controlled by heat exchange jackets 145 on the walls of the second mixer 140 that circulate coolant therethrough (e.g., via coolant/refrigerant input and output lines 146 and 147) to control the temperature of the contents of the second mixer 140 to a temperature in the range of from about 10° C. to about 20° C.; alternatively, from about 12° C. to about 17° C.; alternatively, from about 13° C. to about 16° C.; alternatively, about 15° C. In alternative embodiments, the temperature of the second mixer 140 can be controlled by an external heat exchange circulation loop coupled to the second mixer 140 that removes a portion of the catalyst suspension and cools the suspension in a heat exchanger before passing the cooled suspension back to the second mixer 140, or by any other heat exchange mechanism known in the art with the aid of this disclosure. In some aspects, the amount of propylene can be in excess of the other reactants in an amount such that any heat of pre-polymerization reaction is absorbed by the bulk amount of propylene in the second mixer 140, also referred to herein as adiabatic operation, such that temperature in the second mixer 140 can be controlled by the amount of reactants instead of with heat exchange mechanisms. The residence time of the catalyst suspension in the second mixer 140 can be controlled by the flow rate of the catalyst suspension into and out of the second mixer 140 (e.g., via valve 106 and valve 112), the volume of the second mixer 140, or both. The catalyst particle concentration in the propylene can be controlled by the valve 104 in line 103. The co-catalyst concentration can be controlled by the valve 108 in line 107. The electron donor agent concentration in the propylene can be controlled by the valve 110 in line 109.

The second mixer 140 can be embodied as any vessel that is suitable for pre-polymerization of propylene onto the catalyst particles prior to introduction of the pre-polymerized catalyst particles to a polymerization reactor. In some embodiments, the second mixer 140 can have a stirrer extending within the vessel such that the second mixer 140 is a continuous stirred tank. The vessel can generally be cylindrical in shape. The top and bottom of the vessel can be flat, or can have a contour that is appropriate for holding pressurized contents, e.g., at a pressure suitable for coupling with a polymerization reactor. In some aspects, the height of the second mixer 140 can be 5-20 feet; alternatively, or 8-12 feet; or alternatively, 9-10 feet as measured tangent to tangent. In some aspects, the diameter of the second mixer 140 can be 2-20 feet; alternatively, 3-12 feet; alternatively, 4-10 feet; alternatively, 4-5 feet; or alternatively, 9-10 feet.

A transfer line 111 has an end connected to an outlet 144 of the second mixer 140 and an opposite end connected to a polymerization reactor 170. The transfer line 111 is configured to transport the pre-polymerized catalyst suspension from the second mixer 140 to the polymerization reactor 170. A control valve 112 and pump 113 can be included in transfer line 111 to regulate the flow of pre-polymerized catalyst suspension from the second mixer 140 to the polymerization reactor 170. In some embodiments, the control valve 112 can be an actuator valve that opens and closes to allow and disallow a flow of pre-polymerized catalyst suspension in transfer line 111. In other embodiments, the control valve 112 can be a throttling valve that can control the size of the orifice that is open for flow of pre-polymerized catalyst suspension through the valve 112. The control valve 112 can be controlled by any controller known in the art with the aid of this disclosure. The pump 113 can be embodied as any pump suitable for pumping a slurry of a solid suspended in a liquid (e.g., the pre-polymerized catalyst suspension containing solid catalyst particles coated with polypropylene and mixed in liquid propylene) at a head pressure suitable for feeding the pre-polymerized catalyst suspension to the polymerization reactor 170. Suitable pressures for the pre-polymerized catalyst suspension in transfer line 111 include any pressure that is higher than the pressure in the polymerization reactor 170.

In some embodiments, pre-polymerization can continue in transfer line 111 as the pre-polymerized catalyst suspension flows from the outlet 144 of the second mixer 140 to the inlet 171 of the polymerization reactor 170.

The polymerization reactor 170 is configured to polymerize propylene in the presence of the pre-polymerized catalyst particles (the catalyst particles having the coating of polypropylene) to produce product polypropylene. In aspects, polymerization of propylene is performed under bulk polymerization conditions, where propylene is included as a liquid in the polymerization reactor 170 in an amount of at least 97, 98, or 99 wt % based on the liquids in the polymerization reactor 170. The polymerization reactor 170 can be embodied as one or more polymerization reactors, e.g., one or more loop slurry reactors in series or parallel. The polymerization reactor 170 can also be embodied as one or more loop reactors and one or more gas phase reactors connected in series. For example, in some aspects the polymerization reactor 170 can be two loop reactors. Configurations for these types of polymerization reactors are known, each capable of producing a polypropylene by contacting an olefin monomer with a pre-polymerized catalyst suspension that is introduced via the disclosed system 100. In aspects where the polymerization reactor 170 is more than one reactor, the reactors can be configured to operate in parallel or in series. The polymerization reactor 170 generally has an inlet 171 for the second catalyst suspension and a polymerization product discharge outlet 172. One or more other inlets may be included on polymerization reactor 170 for other reaction components, such as inlets for propylene, comonomer, catalyst, co-catalyst, electron donor agent, or any combination thereof. For clarity, these inlets are not shown on the polymerization reactor 170. Polymerization product containing the polypropylene can flow from the polymerization reactor 170 via polymerization product discharge outlet 172 to a product separation system, which can be of any configuration known in the art.

Figure 2:
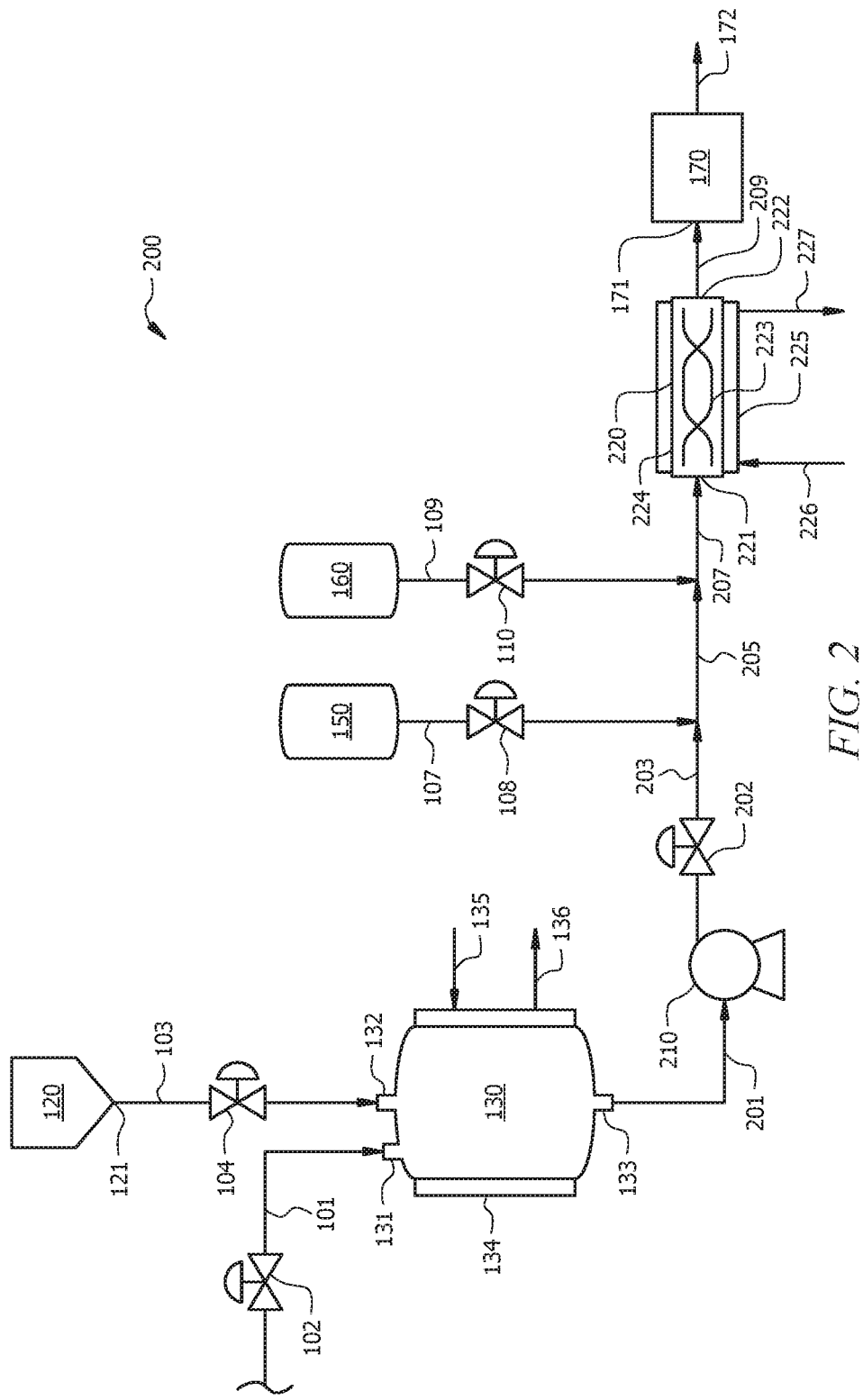
FIG. 2 illustrates a process flow diagram of another embodiment of a continuous pre-polymerization system.

FIG. 2 illustrates a process flow diagram of another embodiment of a pre-polymerization system 200. The system 200 in FIG. 2 utilizes propylene as the diluent for the catalyst. Two mixing vessels are utilized, a first mixer 130 and a second mixer 220 coupled to one another by the various lines that are configured to transport the catalyst suspension and introduce co-catalyst and an optional electron donor agent for pre-polymerization of propylene in and/or upstream of the second mixer 220. Like parts in FIG. 2 with respect to FIG. 1 are labeled with the same numerals, and the previous description of the like parts applies to the system 200 unless otherwise stated. Different than the system 100 in FIG. 1, the second mixer 220 in system 200 in FIG. 2 is embodied as a static mixer, and the co-catalyst and electron donor agent are combined with the catalyst suspension in transfer lines between the first mixer 130 and the second mixer 220.

In the system 200 of FIG. 2, the catalyst suspension is prepared in the first mixer 130 in the same manner as described for the system 100 in FIG. 1. The first mixer 130 in system 200 can have temperature control (e.g., jackets 134) as described for the first mixer 130 in FIG. 1.

A transfer line 201 has an end connected to an outlet 133 of the first mixer 130 and an opposite end connected to the suction inlet of a pump 210. The transfer line 201 is configured to transport the catalyst suspension from the first mixer 130 to the pump 210. No polymerization of propylene occurs in line 201 because the co-catalyst and optional electron donor agent are not present in line 201. A control valve 202 can be included in transfer line 203 to regulate the flow of catalyst suspension from the pump 210 to the second mixer 220. In some embodiments, the control valve 202 can be an actuator valve that opens and closes to allow and disallow a flow of catalyst suspension in transfer line 203. In other embodiments, the control valve 202 can be a throttling valve that can control the size of the orifice that is open for flow of catalyst suspension through the valve 202. The control valve 202 can be controlled by any controller known in the art with the aid of this disclosure.

The pump 210 can be embodied as any pump suitable for pumping a slurry of a solid suspended in a liquid (e.g., the catalyst suspension in line 201, which transforms to the pre-polymerized catalyst suspension containing solid catalyst particles coated with polypropylene and mixed in liquid propylene) at a head pressure suitable for feeding the pre-polymerized catalyst suspension to the polymerization reactor 170. Suitable pressures for the catalyst suspension and pre-polymerized catalyst suspension in transfer lines 203, 205, 207, and 209 include any pressure that is higher than the pressure in the polymerization reactor 170. The pumped catalyst suspension exits the pump 210 in line 203. No polymerization of propylene occurs in line 203 because the co-catalyst and optional electron donor agent are not present in line 203.

The co-catalyst in line 107 can combine with the catalyst suspension in line 203 such that the first catalyst suspension in line 205 contains propylene, catalyst particles, and the co-catalyst. In some embodiments, line 205 can have an end connected to the second mixer 220. In these embodiments, it is contemplated that reaction conditions (e.g., one or more of pressure, temperature, catalyst particle concentration in the propylene, and co-catalyst concentration in the propylene) of the catalyst suspension in line 205 can be controlled such that a controlled amount of polymerization of propylene occurs on the surface of the catalyst particles in a manner that is consistent with pre-polymerization; alternatively, any combination of these conditions in line 205, in addition to residence time in line 205, are such that no significant amount of pre-polymerization can occur in line 205 (e.g., for catalyst systems that require electron donor agent to initiate pre-polymerization, as discussed below).

In optional embodiments, the electron donor agent in line 109 can combine with the first catalyst suspension in line 205 such that the first catalyst suspension in line 207 contains propylene, catalyst particles, the co-catalyst, and the electron donor agent. Line 207 can have an end connected to the inlet 221 of the second mixer 220. Reaction conditions (e.g., one or more of pressure, temperature, catalyst particle concentration in the propylene, co-catalyst concentration in the propylene, and electron donor agent concentration in the propylene) of the catalyst suspension in line 207 can be controlled such that a controlled amount of polymerization of propylene occurs on the surface of the catalyst particles in a manner that is consistent with pre-polymerization; alternatively, any combination of conditions in line 207, in addition to residence time in line 207, are such that no significant amount of pre-polymerization occurs in line 207.

The first catalyst suspension can flow into the inlet 221 of the second mixer 220. The second mixer 220 is configured to polymerize propylene in the presence of the catalyst to produce a coating of polypropylene on the catalyst particles that are received from the transfer line 205 or 207. As discussed above, the second mixer 220 can be embodied as a static mixer. In some aspects, the static mixer can have fixed baffles 223 (e.g., in a helical arrangement, or any other baffle arrangement) placed within a housing 224, where the baffles 223 continuously blend the components of the first catalyst suspension. The housing 224 can have a length in the range of from about 1 ft to about 100 ft (0.3048 m to 30.48 m); alternatively, from about 5 ft to about 20 ft (1.5 m to 6.1 m). The housing 224 can have a diameter in the range of about 0.1875 in to about 12 in (0.477 cm to 30.48 cm); alternatively, from about 0.5 in to about 3 in (1.27 cm to 7.62 cm).

Reaction conditions (e.g., one or more of pressure, temperature, residence time, catalyst particle concentration in the propylene, co-catalyst concentration in the propylene, and electron donor concentration in the propylene) of the catalyst suspension in the second mixer 220 can be controlled such that a controlled amount of polymerization of propylene can occur on the surface of the catalyst particles in a manner that is consistent with pre-polymerization. In some aspects, the reaction conditions that are controlled in the second mixer 220 for pre-polymerization of propylene are co-catalyst concentration in the propylene, electron donor agent concentration in the propylene, temperature, and residence time of the catalyst suspension in the second mixer 220. The reaction conditions within the second mixer 220 may be controlled to have a lower temperature and/or lower polymerization rate, as compared to a polymerization reactor 170, to allow the pre-polymer particles to form without exceeding a pre-polymer particle size that would foul any downstream lines (e.g., line 209) and/or downstream equipment (e.g., inlet 171).

The pressure in the second mixer 220 can be controlled by the pressure of line 209. The temperature of the second mixer 220 can be controlled by heat exchange jackets 225 on the walls of the second mixer 220 that circulate coolant therethrough (e.g., via coolant/refrigerant input and output lines 226 and 227) to control the temperature of the contents of the second mixer 220 to a temperature in the range of from about 10° C. to about 20° C.; alternatively, from about 12° C. to about 17° C.; alternatively, from about 13° C. to about 16° C.; alternatively, about 15° C. In alternative embodiments, the temperature of the second mixer 220 can be controlled by any other heat exchange mechanism known in the art with the aid of this disclosure. In some aspects, the amount of propylene can be in excess of the other reactants in an amount such that any heat of pre-polymerization reaction is absorbed by the bulk amount of propylene in the second mixer 220, also referred to herein as adiabatic operation, such that temperature in the second mixer 220 can be controlled by the amount of reactants instead of with heat exchange mechanisms. The residence time of the catalyst suspension in the second mixer 220 can be controlled by the flow rate of the catalyst suspension into and out of the second mixer 220 (e.g., via pump 210), the volume of the housing 224 of the second mixer 220, or both. The catalyst particle concentration in the propylene can be controlled by the valve 104 in line 103. The co-catalyst concentration can be controlled by the valve 108 in line 107. The electron donor agent concentration in the propylene can be controlled by the valve 110 in line 109.

Line 209 has an end connected to the outlet 222 of the second mixer 220 and an opposite end connected to the inlet 171 of the polymerization reactor 170. The pre-polymerized catalyst suspension can flow from the outlet 222 of the second mixer 220 to the inlet 171 of the polymerization reactor 170 via transfer line 209. In some embodiments, pre-polymerization can continue in transfer line 209 as the pre-polymerized catalyst suspension flows from the outlet 222 of the second mixer 220 to the inlet 171 of the polymerization reactor 170.

It is contemplated that any combination of transfer lines 201, 203, 205, 207, and 209 can be collectively referred to as a transfer line in system 200. For example, transfer lines 201, 203, 205, 207, and 209 can be referred to a single transfer line in which the control valve 202, pump 210, and second mixer 220 are placed.

Once introduced into the polymerization reactor 170, the pre-polymerized catalyst particles contact propylene monomer under polymerization conditions to form bulk polypropylene as a polymerization product. As described above for the system 100 in FIG. 1, the polymerization product containing polypropylene is recovered from the polymerization reactor 170 via polymerization product discharge outlet 172.

Figure 3:
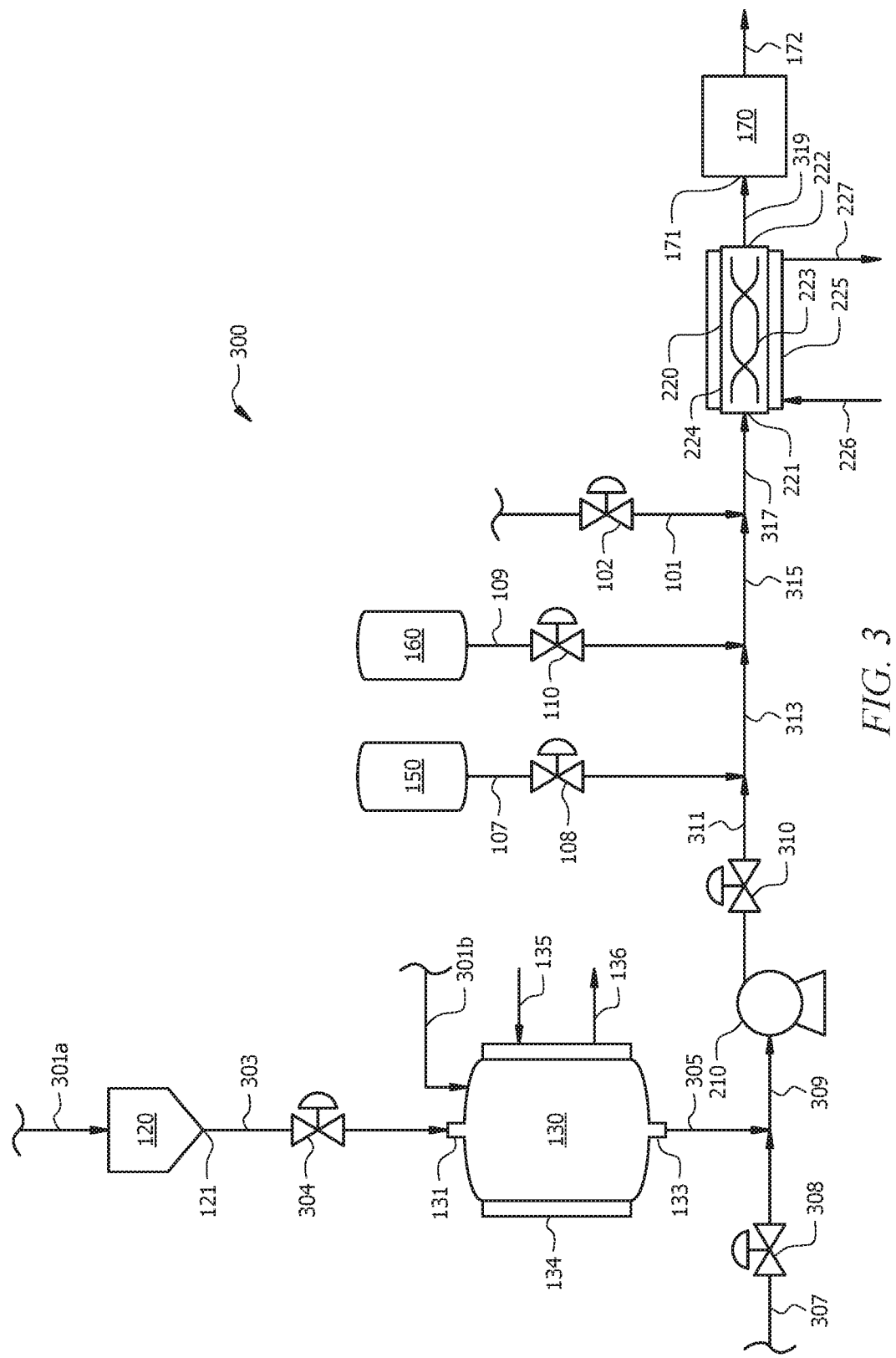
FIG. 3 illustrates a process flow diagram of another embodiment of a continuous pre-polymerization system.

FIG. 3 illustrates a process flow diagram of another embodiment of a pre-polymerization system 300. Like parts with respect to FIG. 1 and/or FIG. 2 are labeled with the same numerals, and the previous description of the like parts applies to the system 300 unless otherwise stated. The system 300 in FIG. 3 utilizes a saturated hydrocarbon as the diluent for the catalyst. The saturated hydrocarbon can be any $C_3$ to $C_4$ saturated hydrocarbon. In some aspects, the hydrocarbon used as diluent can include propane, n-butane, mixed butanes, or a combination thereof.

Similar to the system 100 in FIG. 1 and the system 200 in FIG. 2, system 300 in FIG. 3 includes the first mixer 130. Similar to the system 200 in FIG. 2, the system 300 includes the second mixer 220 embodied as a static mixer. However, different from both system 100 in FIG. 1 and system 200 in FIG. 2, in the system 300 of FIG. 3, the feed line 101 through which propylene is introduced into the system 300 is placed upstream of the second mixer 220 at a location that is downstream of the locations where the catalyst, co-catalyst, and optional electron donor agent are introduced (e.g., downstream of the location where the feed line 107 connects with transfer line 311, downstream of the location where the feed line 109 connects with transfer line 313, or both). The saturated hydrocarbon that is used to make catalyst suspensions is introduced via feed line 301a or 301b in combination with feed line 307, i.e., in two locations in the system 300 of FIG. 3.

In one aspect, a first amount of the saturated hydrocarbon, in liquid phase, is introduced to the catalyst hopper 120 via feed line 301a. The saturated hydrocarbon mixes with the catalyst particles in the catalyst hopper 120, and a slurry of the catalyst particles in the liquid saturated hydrocarbon flows from the catalyst hopper 120 to the first mixer 130 via feed line 303. The catalyst particles are solid particles of the catalyst as described for FIG. 1. The feed line 303 has an end connected to an outlet 121 of the catalyst hopper 120 and an opposite end connected to the inlet 131 of the first mixer 130. A control valve 304 can be included in feed line 303 to regulate the flow of the slurry from the catalyst hopper 120 into the first mixer 130. In some embodiments, the control valve 304 can be a cycling valve that meters the amount of the catalyst slurry that flows in feed line 303 to the first mixer 130. In other embodiments, the control valve 304 can be an actuator valve that opens and closes to allow and disallow a flow of the catalyst slurry in feed line 303. In yet other embodiments, the control valve 304 can be a throttling valve that can control the size of the orifice that is open for flow of the catalyst slurry through the valve 304. The control valve 304 can be controlled by any controller known in the art with the aid of this disclosure.

In another aspect, the first amount of saturated hydrocarbon, in liquid phase, is introduced to the first mixer 130 via feed line 301b, while dry catalyst is fed to the first mixer 130 from the catalyst hopper 120 via line 303 and valve 304. In such an aspect, the valve 304 is configured to meter or actuate solid catalyst particles into the first mixer 130, where the solid catalyst particles mix with the saturated hydrocarbon in the first mixer 130.

The first mixer 130 is configured to mix the catalyst particles and saturated hydrocarbon to form the first catalyst suspension. Similar to the first mixer 130 in FIGS. 1 and 2, the first mixer 130 in the system 300 of FIG. 3 can be embodied as any vessel that is suitable for mixing catalyst suspensions, and particularly, for mixing catalyst suspensions that are used for the polymerization of propylene, e.g., for introduction to a loop slurry reactor or a gas phase reactor. The vessel can generally be cylindrical in shape. The top and bottom of the vessel can be flat, or can have a contour that is appropriate for holding pressurized contents, e.g., at a pressure suitable for coupling with a polymerization reactor. In some embodiments, the first mixer 130 can have a stirrer extending within the vessel such that the first mixer 130 is a continuous stirred tank. The first mixer 130 in system 300 can have temperature control (e.g., jackets 134) as described for the first mixer 130 in FIG. 1; alternatively, since a saturated hydrocarbon is used to dilute the catalyst in the first mixer 130, cooling jackets 134 may not be needed for the first mixer 130. The dimensions of the first mixer 130 in system 300 can be those described for the first mixer 130 in the system 100 in FIG. 1. The mixed first catalyst suspension can flow from the outlet 133 of the first mixer 130 via transfer line 305, which has an end connected to the outlet 133 of the first mixer 130.

A second amount of the saturated hydrocarbon flows in feed line 307. The feed line 307 can be connected to the transfer line 309 downstream of the outlet 133 of the first mixer 130 and upstream of the location where the feed line 107 connects to transfer line 311. A control valve 308 can be included in feed line 307 to regulate the flow of the second amount of saturated hydrocarbon in feed line 307. In some embodiments, the control valve 308 can be an actuator valve that opens and closes to allow and disallow a flow of the saturated hydrocarbon in feed line 307. In other embodiments, the control valve 308 can be a throttling valve that can control the size of the orifice that is open for flow of the saturated hydrocarbon through the valve 308. The control valve 308 can be controlled by any controller known in the art with the aid of this disclosure.

The feed line 307 and the transfer line 305 are configured to combine to form transfer line 309 that contains the first catalyst suspension having a third amount of the liquid saturated hydrocarbon and the catalyst particles. The third amount of the saturated hydrocarbon in line 309 is the sum of the amount of saturated hydrocarbon contained in the transfer line 305 and the amount of saturated hydrocarbon contained in the feed line 307. The transfer line 309 has an end connected to the suction inlet of the pump 210. No polymerization of propylene occurs in line 309 because propylene is not present in line 309. A control valve 310 can be included in feed line 311 to regulate the flow of the first catalyst suspension in transfer line 311. In some embodiments, the control valve 310 can be an actuator valve that opens and closes to allow and disallow a flow of the catalyst suspension in transfer line 311. In other embodiments, the control valve 310 can be a throttling valve that can control the size of the orifice that is open for flow of the catalyst suspension through the valve 310. The control valve 310 can be controlled by any controller known in the art with the aid of this disclosure.

The pump 210 can be similarly configured as previously described, and the first catalyst suspension can flow from the pump 210 via transfer line 311. No polymerization of propylene occurs in line 311 because propylene is not present in line 311.

The co-catalyst in line 107 can combine with the first catalyst suspension in line 311 such that the first catalyst suspension in line 313 contains the saturated hydrocarbon, catalyst particles, and the co-catalyst in line 313.

In some embodiments, line 313 can have an end that combines with the feed line 101 (containing propylene) such that the first catalyst suspension combines with propylene such that the first catalyst suspension in line 317 contains the saturated hydrocarbon, propylene, catalyst particles, and the co-catalyst. The end of the line 317 can connect with the inlet 221 of the second mixer 220. In other embodiments such as that shown in the system 300 of FIG. 3, line 313 can have an end that can combine with feed line 109 (containing the electron donor agent) such that the first catalyst suspension in line 315 contains the saturated hydrocarbon, catalyst particles, the co-catalyst, and the electron donor agent. Line 315 can have an end that combines with feed line 101 (containing propylene) such that the first catalyst suspension in line 317 contains the saturated hydrocarbon, propylene, catalyst particles, the co-catalyst, and the electron donor agent.

Reaction conditions (e.g., one or more of pressure, temperature, residence time, propylene concentration in the saturated hydrocarbon, catalyst particle concentration in the saturated hydrocarbon, co-catalyst concentration in the saturated hydrocarbon, and the optional electron donor agent concentration in the saturated hydrocarbon) of the catalyst suspension in line 317 can be controlled such that a controlled amount of polymerization of propylene occurs on the surface of the catalyst particles in a manner that is consistent with pre-polymerization. Alternatively, any combination of conditions in line 317 are such that no significant amount of pre-polymerization occurs in line 317.

The first catalyst suspension can flow into the inlet 221 of the second mixer 220. The second mixer 220 is configured to polymerize propylene in the presence of the catalyst to produce a coating of polypropylene on the catalyst particles that are received from the transfer line 317. As discussed above, the second mixer 220 can be embodied as a static mixer. In some aspects, the static mixer can have fixed baffles 223 (e.g., in a helical arrangement, or any other baffle arrangement) placed within a housing 224, where the baffles 223 continuously blend the components of the first catalyst suspension. Reaction conditions (e.g., one or more of pressure, temperature, residence time, catalyst particle concentration in the propylene, co-catalyst concentration in the propylene, and electron donor concentration in the propylene) of the catalyst suspension in the second mixer 220 of FIG. 3 can be controlled such that a controlled amount of polymerization of propylene can occur on the surface of the catalyst particles in a manner that is consistent with pre-polymerization. In some aspects, the reaction conditions that are controlled in the second mixer 220 for pre-polymerization of propylene are concentration in the saturated hydrocarbon, co-catalyst concentration in the saturated hydrocarbon, electron donor agent concentration in the saturated hydrocarbon, temperature, and residence time of the catalyst suspension in the second mixer 220 in the system 300 of FIG. 3. The reaction conditions within the second mixer 220 may be controlled to have a lower temperature and/or lower polymerization rate, as compared to a polymerization reactor 170, to allow the pre-polymer particles to form without exceeding a pre-polymer particle size that would foul any downstream lines (e.g., line 319) and/or downstream equipment (e.g., inlet 171).

The pressure in the second mixer 220 can be controlled by the pressure of line 317. The temperature of the second mixer 220 can be controlled by the techniques described for the second mixer 220 in FIG. 2. In some aspects, the amount of saturated hydrocarbon can be in excess of the reactants in an amount such that any heat of pre-polymerization reaction is absorbed by the bulk amount of saturated hydrocarbon in the second mixer 220, also referred to herein as adiabatic operation, such that temperature in the second mixer 220 can be controlled by the amount of saturated hydrocarbon relative to the amount of reactants instead of with heat exchange mechanisms. The residence time of the catalyst suspension in the second mixer 220 can be controlled by the flow rate of the catalyst suspension into and out of the second mixer 220 (e.g., via pump 210), the volume of the housing 224 of the second mixer 220, or both. The propylene concentration in the saturated hydrocarbon can be controlled by the valve 102 in feed line 101. The catalyst particle concentration in the saturated hydrocarbon can be controlled by the valve 304 in line 303. The co-catalyst concentration can be controlled by the valve 108 in line 107. The electron donor agent concentration in the propylene can be controlled by the valve 110 in line 109.

Line 319 has an end connected to the outlet 222 of the second mixer 220 and an opposite end connected to the inlet 171 of the polymerization reactor 170. The pre-polymerized catalyst suspension can flow from the outlet 222 of the second mixer 220 to the inlet 171 of the polymerization reactor 170 via transfer line 319. In some embodiments, pre-polymerization can continue in transfer line 319 as the pre-polymerized catalyst suspension flows from the outlet 222 of the second mixer 220 to the inlet 171 of the polymerization reactor 170.

It is contemplated that any combination of transfer lines 305, 309, 311, 313, 315, 317, and 319 can be collectively referred to as a transfer line in system 300. For example, transfer lines 305, 309, 311, 313, 315, 317, and 319 can be referred to a single transfer line in which the control valve 310, pump 210, and second mixer 220 are placed.

Once introduced into the polymerization reactor 170, the pre-polymerized catalyst particles contact propylene monomer under polymerization conditions to form bulk polypropylene as a polymerization product. As described above for the system 100 in FIG. 1 and the system 200 in FIG. 2, the polymerization product containing polypropylene is recovered from the polymerization reactor 170 via polymerization product discharge outlet 172.

Figure 4:
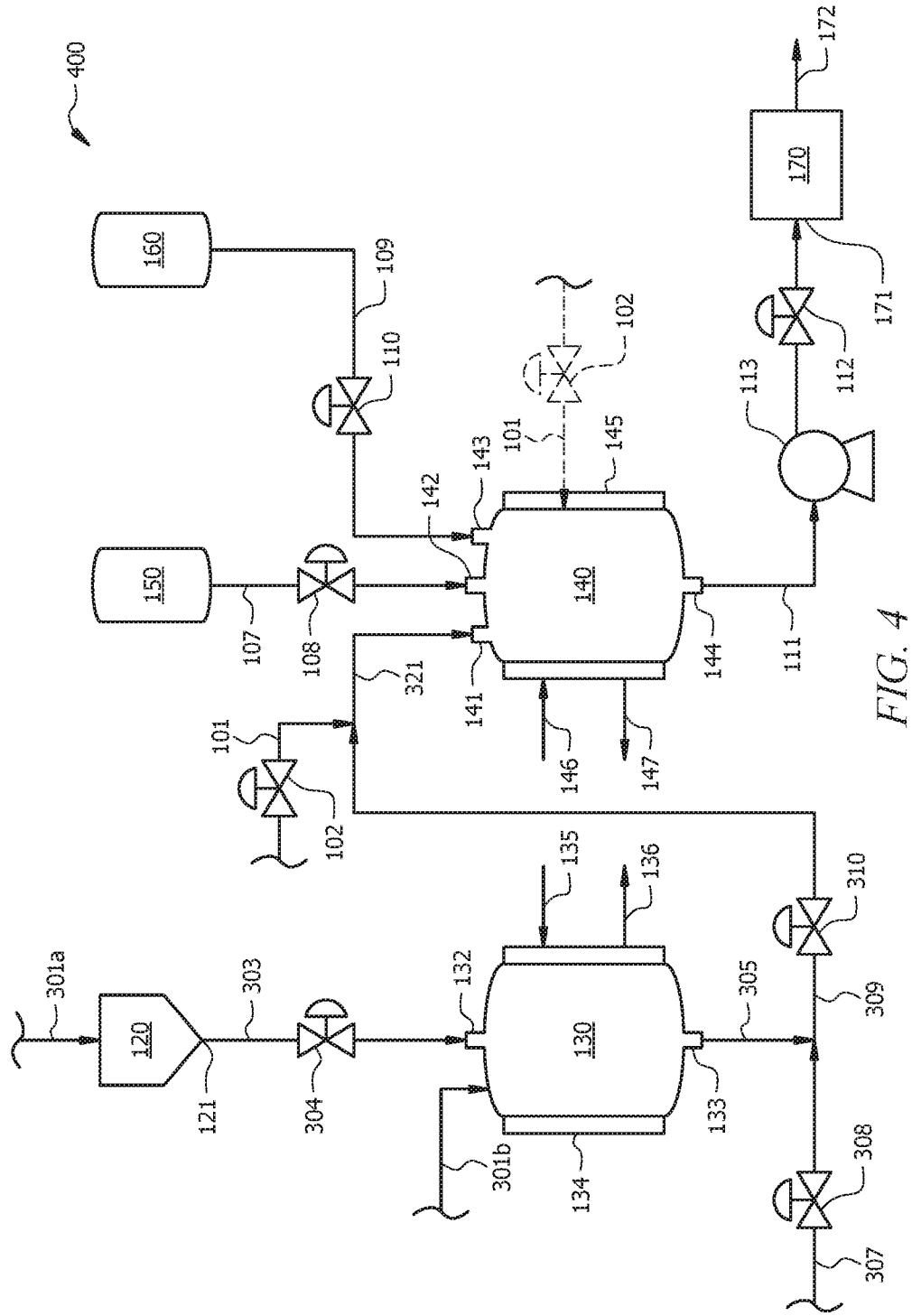
FIG. 4 illustrates a process flow diagram of another embodiment of a continuous pre-polymerization system.

FIG. 4 illustrates a process flow diagram of an embodiment of a continuous pre-polymerization system 400. Like parts with respect to FIGS. 1-3 are labeled with the same numerals, and the previous description of the like parts applies to the system 400 unless otherwise stated.

Similar to the system 300 in FIG. 3, the system 400 in FIG. 3 utilizes a saturated hydrocarbon as the diluent for the catalyst. The saturated hydrocarbon can be any $C_3$ to $C_4$ saturated hydrocarbon. In some aspects, the saturated hydrocarbon used as diluent can include propane, n-butane, mixed butanes, or a combination thereof. Similar to the system 100 in FIG. 1, the system 200 in FIG. 2, and the system 300 in FIG. 3, the system 400 in FIG. 4 includes the first mixer 130. The first mixer 130 in system 400 can have temperature control (e.g., jackets 134) as described for the first mixer 130 in FIG. 1; alternatively, since a saturated hydrocarbon is used to dilute the catalyst in the first mixer 130, cooling jackets 134 may not be needed for the first mixer 130. Similar to the system 100 in FIG. 1, the system 400 includes the second mixer 140 embodied as a continuous stirred-tank.

The saturated hydrocarbon that is used to make catalyst suspensions is introduced via feed lines 301 and 307, i.e., in two locations in the system 400 of FIG. 4. Transfer line 309 contains the first catalyst suspension that is prepared in the manner described for the system 300 in FIG. 3. The first catalyst suspension can flow in transfer line 309 to combine with feed line 101 that contains propylene to form line 321 such that the first catalyst suspension contains the saturated hydrocarbon, the catalyst particles, and propylene. Transfer line 321 can have an end connected to the inlet 141 of the second mixer 140. No polymerization of propylene occurs in line 321 because the co-catalyst and optional electron donor agent are not present in line 321. Alternatively, transfer line 309 can be connected to the inlet 141 of the second mixer 140, and the feed line 101 can combine with feed line 107 or feed line 109, or feed line 101 can be connected to another inlet of the second mixer 140 (see dashed feed line 101 in FIG. 4). In such embodiments, line 309 has an opposite end connected with the inlet 141 of the second mixer 140.

The reaction conditions (e.g., one or more of pressure, temperature, residence time, propylene concentration in the saturated hydrocarbon, catalyst particle concentration in the saturated hydrocarbon, co-catalyst concentration in the saturated hydrocarbon, and electron donor agent concentration in the saturated hydrocarbon) of the catalyst suspension within the second mixer 140 may be controlled to have a lower temperature and/or lower polymerization rate, as compared to a polymerization reactor 170, to allow the pre-polymer particles to form without exceeding a pre-polymer particle size that would foul any downstream lines (e.g., line 111) and/or downstream equipment (e.g., pump 113, valve 112, inlet 171). In some aspects, the reaction conditions that are controlled in the second mixer 140 for pre-polymerization of propylene are propylene concentration in the saturated hydrocarbon, co-catalyst concentration in the saturated hydrocarbon, electron donor agent concentration in the saturated hydrocarbon, temperature, and residence time of the catalyst suspension in the second mixer 140. The pressure in the second mixer 140 can be controlled by a supply of inert gas or other pressure control mechanism known in the art with the aid of this disclosure. The temperature of the second mixer 140 can be controlled by heat exchange jackets 145 on the walls of the second mixer 140 that circulate coolant therethrough (e.g., via coolant/refrigerant input and output lines 146 and 147) to control the temperature of the contents of the second mixer 140 to a temperature in the range of from about 10° C. to about 20° C.; alternatively, from about 12° C. to about 17° C.; alternatively, from about 13° C. to about 16° C.; alternatively, about 15° C. In alternative embodiments, the temperature of the second mixer 140 can be controlled by an external heat exchange circulation loop coupled to the second mixer 140 that removes a portion of the catalyst suspension and cools the suspension in a heat exchanger before passing the cooled suspension back to the second mixer 140, or by any other heat exchange mechanism known in the art with the aid of this disclosure. In some aspects, the amount of saturated hydrocarbon can be in excess of the reactants in an amount such that any heat of pre-polymerization reaction is absorbed by the bulk amount of saturated hydrocarbon in the second mixer 140, also referred to herein as adiabatic operation, such that temperature in the second mixer 140 can be controlled by the amount of saturated hydrocarbon relative to the reactants instead of with heat exchange mechanisms. The residence time of the catalyst suspension in the second mixer 140 can be controlled by the flow rate of the catalyst suspension into and out of the second mixer 140 (e.g., via valve 310 and valve 112), the volume of the second mixer 140, or both. The catalyst particle concentration in the propylene can be controlled by the valve 304 in line 303. The co-catalyst concentration can be controlled by the valve 108 in line 107. The electron donor agent concentration in the propylene can be controlled by the valve 110 in line 109.

Line 111 has an end connected to an outlet 144 of the second mixer 140 and an opposite end connected to the inlet 171 of the polymerization reactor 170. The flow of the pre-polymerized catalyst suspension from the second mixer 140 via line 111 to the polymerization reactor 170 is the same as described for the system 100 in FIG. 1.

FIGS. 5-8 illustrate process flow diagrams of pre-polymerization systems that utilize a storage tank 180. Like parts in FIGS. 5-8 with respect to FIGS. 1-4 are labeled with the same numerals, and the previous description of the like parts applies unless otherwise stated.

Figure 5:
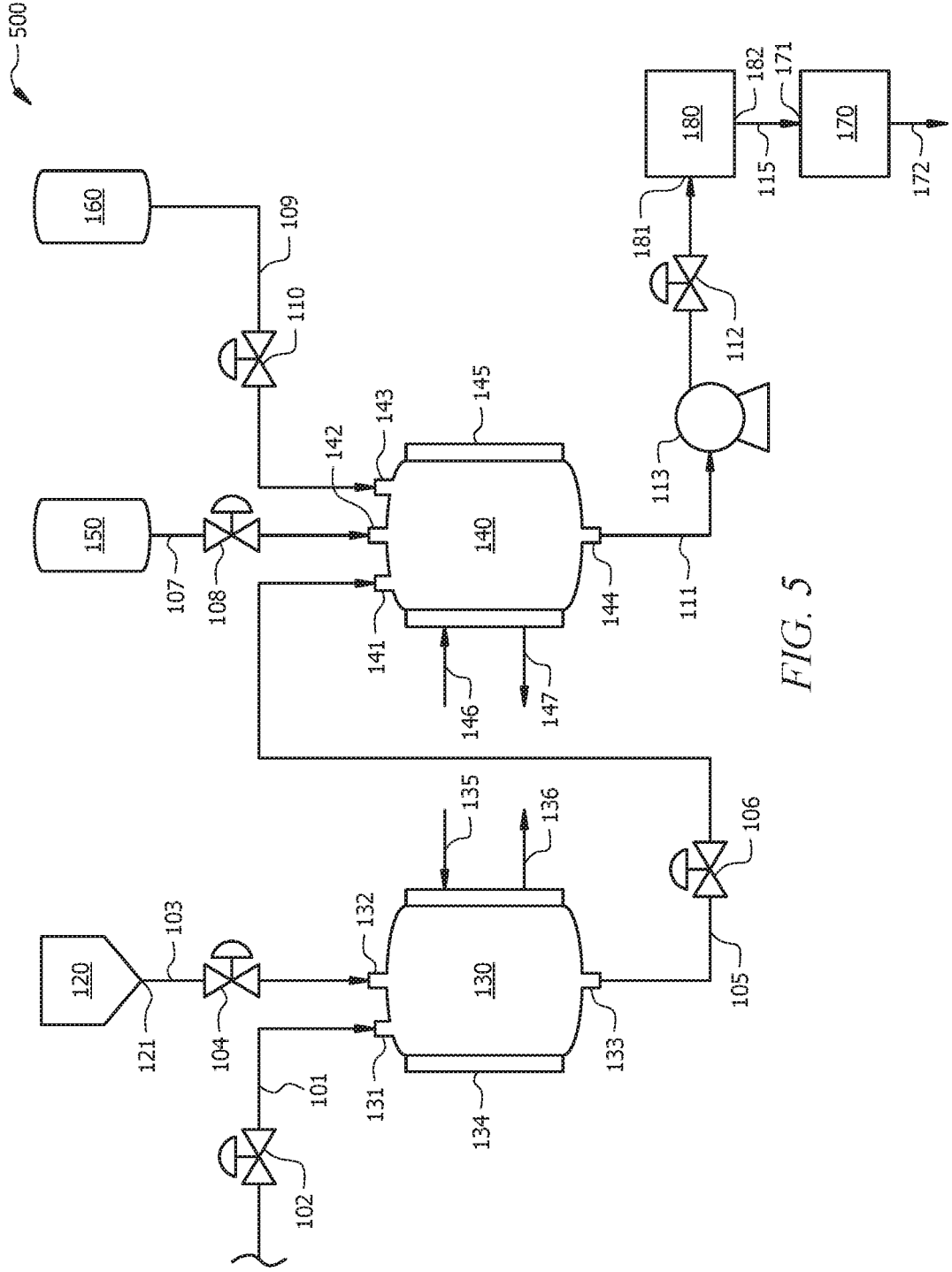
FIG. 5 illustrates a process flow diagram of an embodiment of a batch pre-polymerization system.

FIG. 5 illustrates a process flow diagram of an embodiment of a batch pre-polymerization system 500. The system 500 in FIG. 5 is similar to the system 100 of FIG. 1, except the pre-polymerized catalyst suspension flows via line 111 to a storage tank 180 before flowing to the polymerization reactor 170 via line 115. Line 111 is connected to the outlet 144 of the second mixer 140 and to an inlet 181 of the storage tank 180. Line 115 is connected to the outlet 182 of the storage tank 180 and to the inlet 171 of the polymerization reactor 170.

Figure 6:
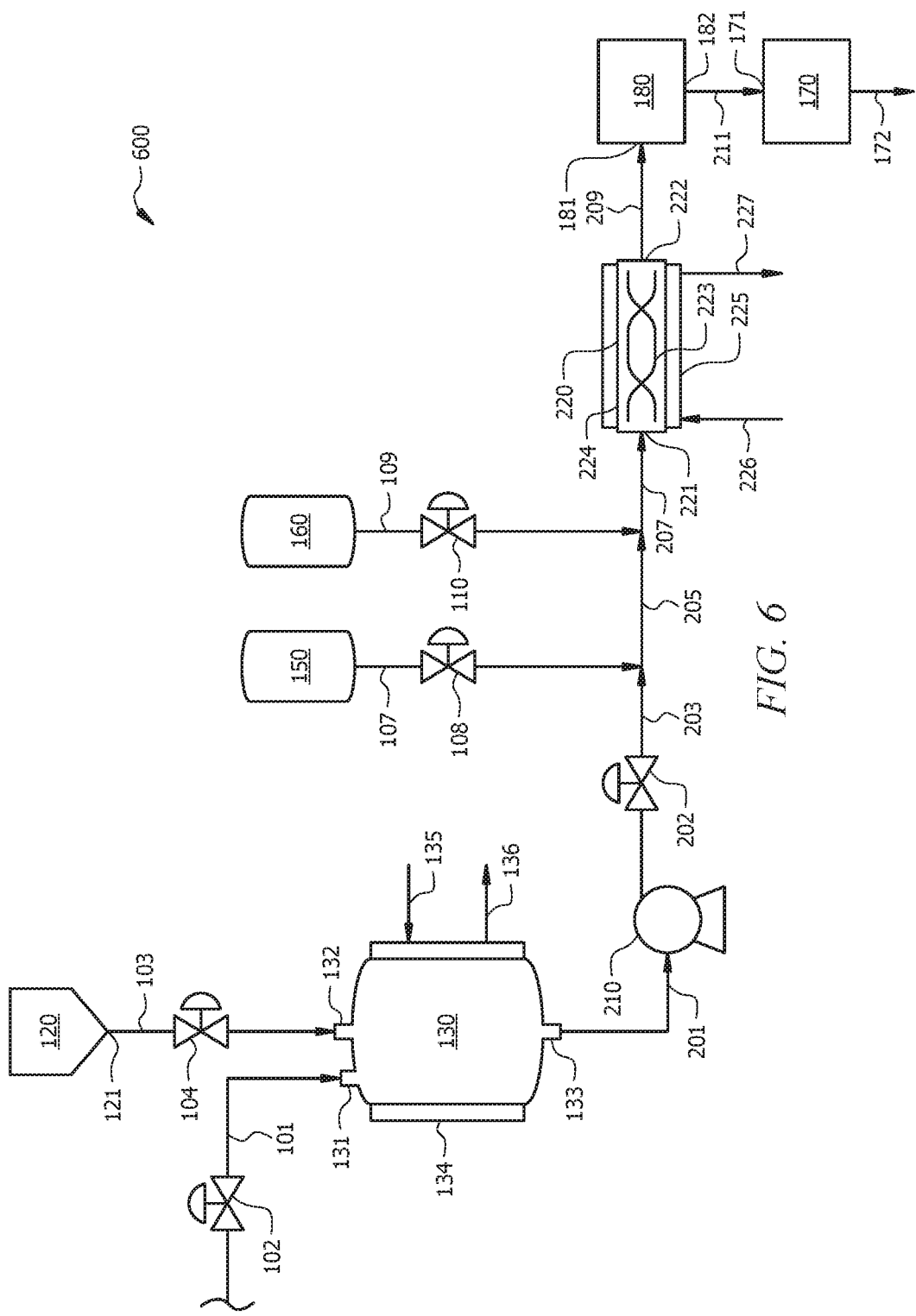
FIG. 6 illustrates a process flow diagram of another embodiment of a batch pre-polymerization system.

FIG. 6 illustrates a process flow diagram of another embodiment of a batch pre-polymerization system 600. The system 600 in FIG. 6 is similar to the system 200 of FIG. 2, except the pre-polymerized catalyst suspension flows via line 209 to a storage tank 180 before flowing to the polymerization reactor 170 via line 211. Line 209 is connected to the outlet 222 of the second mixer 220 and to an inlet 181 of the storage tank 180. Line 211 is connected to the outlet 182 of the storage tank 180 and to the inlet 171 of the polymerization reactor 170.

Figure 7:
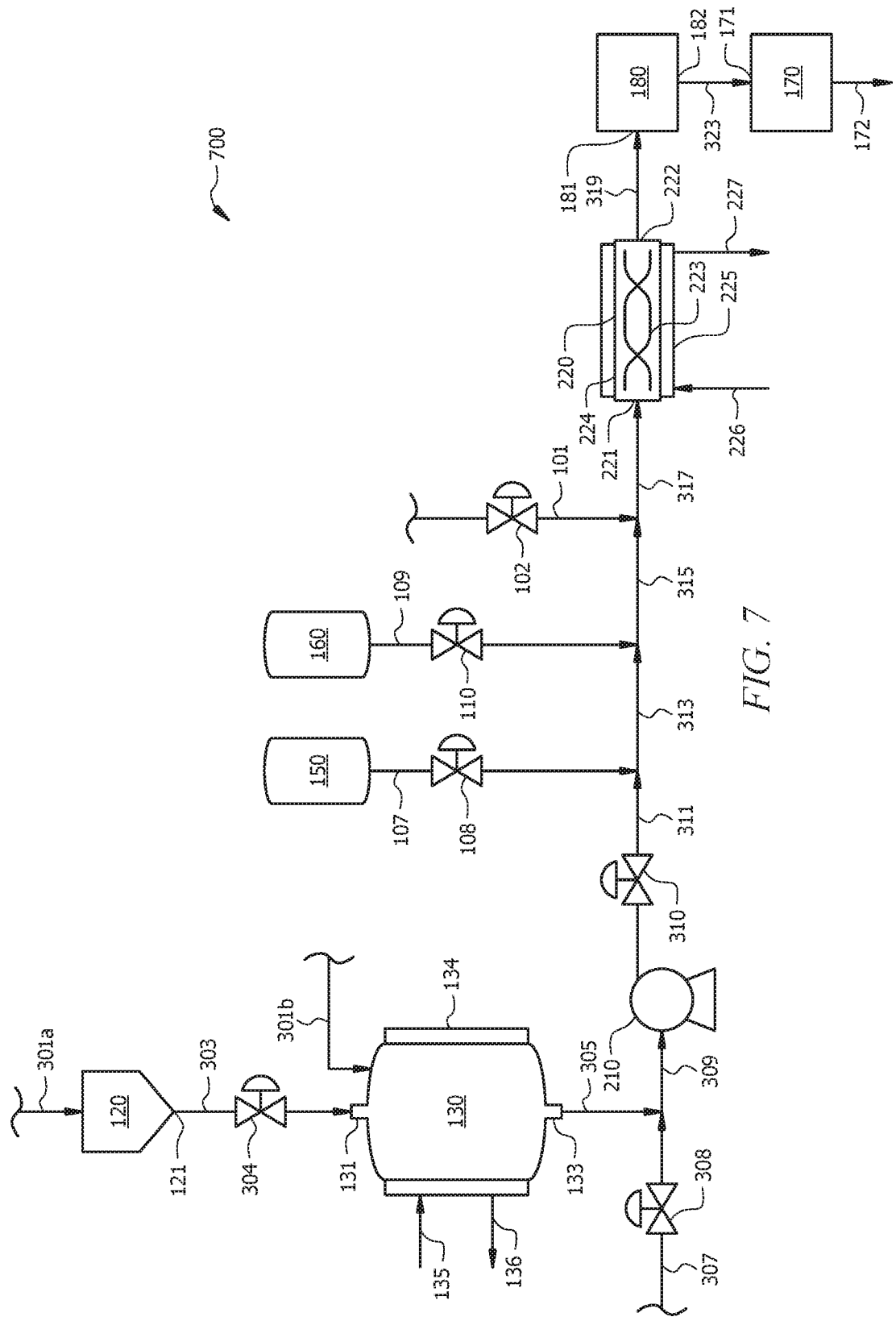
FIG. 7 illustrates a process flow diagram of another embodiment of a batch pre-polymerization system.

FIG. 7 illustrates a process flow diagram of another embodiment of a batch pre-polymerization system 700. The system 700 in FIG. 7 is similar to the system 300 of FIG. 3, except the pre-polymerized catalyst suspension flows via line 319 to a storage tank 180 before flowing to the polymerization reactor 170 via line 323. Line 319 is connected to the outlet 222 of the second mixer 220 and to an inlet 181 of the storage tank 180. Line 323 is connected to the outlet 182 of the storage tank 180 and to the inlet 171 of the polymerization reactor 170.

Figure 8:
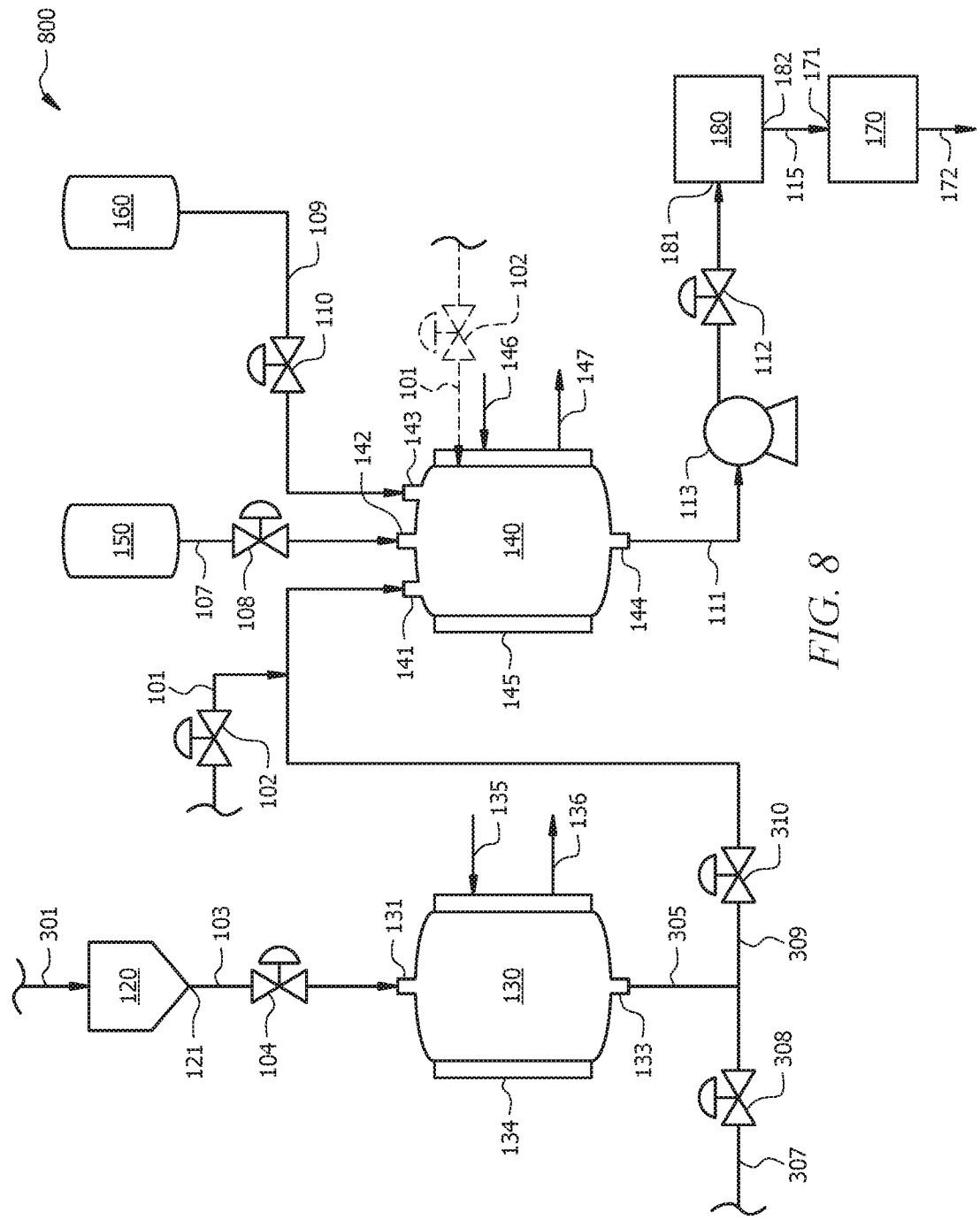
FIG. 8 illustrates a process flow diagram of another embodiment of a batch pre-polymerization system.

FIG. 8 illustrates a process flow diagram of another embodiment of a batch pre-polymerization system 800. The system 800 in FIG. 8 is similar to the system 400 of FIG. 4, except the pre-polymerized catalyst suspension flows via line 111 to a storage tank 180 before flowing to the polymerization reactor 170 via line 115. Line 111 is connected to the outlet 222 of the second mixer 220 and to an inlet 181 of the storage tank 180. Line 115 is connected to the outlet 182 of the storage tank 180 and to the inlet 171 of the polymerization reactor 170.

In each of the systems 500, 600, 700, and 800 described hereinabove, the storage tank 180 can be embodied as any vessel that is suitable for storing pre-polymerized catalyst suspensions, e.g., for introduction to a polymerization reactor 170. The vessel can generally be cylindrical in shape. The top and bottom of the vessel can be flat, or can have a contour that is appropriate for holding pressurized contents, e.g., at a pressure suitable for coupling with a polymerization reactor. In some embodiments, the storage tank 180 can have a stirrer extending within the vessel such that the storage tank 180 is a continuous stirred tank. In some aspects, the height of the storage tank 180 can be 5-20 feet; alternatively, or 8-12 feet; or alternatively, 9-10 feet as measured tangent to tangent. In some aspects, the diameter of the storage tank 180 can be 2-20 feet; alternatively, 3-12 feet; alternatively, 4-10 feet; alternatively, 4-5 feet; or alternatively, 9-10 feet. In some aspects, the storage tank 180 can have a volume that is larger than a volume of the first mixer 130, the second mixer 140/220, or both the first mixer 130 and the second mixer 140/220.

The storage tank 180 enables an operator to make pre-polymerized catalyst suspensions at production rates that exceed the rate of consumption of the pre-polymerized catalyst suspension by the polymerization reactor 170. The size of the storage tank 180 can be designed to provide a residence time for the catalyst suspension such that pre-polymer particles sizes are not too large to flow in the lines and equipment upstream of the polymerization reactor 170. Additionally or alternatively, the storage tank 180 can have a cooling system (a cooling circuit, a cooling jacket, or internally placed cooling elements) that cools the pre-polymerized catalyst suspension to lower the polymerization rate or stop pre-polymerization of propylene until the pre-polymerized catalyst suspension is introduced to the polymerization reactor 170.

It is contemplated that the appropriate flow devices for introducing the pre-polymerized catalyst suspension into the polymerization reactor 170 can be included in line 115 of FIGS. 5 and 8, line 211 of FIG. 6, and line 323 of FIG. 7.

The coolant/refrigerant that is utilized to control the temperature of the first mixer 130 and the coolant/refrigerant that is utilized to control the temperature of the second mixer 140/220 can be part of the same coolant/refrigerant circuit or be separate coolant/refrigerant circuits. Coolants/refrigerants suitable for controlling the first mixer 130 and second mixer 130/220 to the temperatures disclosed herein can include water, methane, ethane, propane, propylene, mixed butanes, or combinations thereof. In some aspects, the coolant/refrigerant is a coolant such as cooling water; in other aspects, the coolant/refrigerant is a refrigerant selected from methane, ethane, propane, propylene, mixed butanes, or combinations thereof.

In aspects, any combination of the lines/conduits described in FIGS. 1-8 can include insulation wrapped therearound so as to prevent heat exchange of the conduit contents with the surrounding environment.

Pre-polymerization conditions in the second mixer 140/220 and any lines downstream thereof include the weight ratio of propylene to catalyst, the weight ratio of co-catalyst to catalyst, the weight ratio of electron donor agent to catalyst, temperature, and residence time. Suitable values for the weight ratio of propylene to catalyst include values in the range of from 0.01 to 10 g propylene/g catalyst; alternatively, from 0.01 to 9 g propylene/g catalyst; alternatively, from 0.01 to 8 g propylene/g catalyst; alternatively, from 0.01 to 7 g propylene/g catalyst; alternatively, from 0.01 to 6 g propylene/g catalyst; alternatively, about from 0.01 to 5 g propylene/g catalyst. Suitable values for the weight ratio of co-catalyst to catalyst include values in the range of from 0.05 to 1 g co-catalyst/g catalyst; alternatively, from 0.08 to 0.75 g co-catalyst/g catalyst; alternatively, from 0.09 to 0.5 g co-catalyst/g catalyst; alternatively, from 0.1 to 0.3 g co-catalyst/g catalyst; alternatively, about 0.125 g co-catalyst. Suitable values for the weight ratio of electron donor agent to catalyst include values in the range of from 0.001 to 0.1 g donor agent/g catalyst; alternatively, 0.005 to 0.05 g donor agent/g catalyst; alternatively, about 0.01 g donor agent/g catalyst. Suitable temperatures for pre-polymerization in values in the range of from about 0° C. to about 20° C.; alternatively, from about 2° C. to about 18° C.; alternatively, from about 3° C. to about 17° C.; alternatively, about 4° C. to about 16° C.; alternatively, from about 5° C. to about 15° C. Suitable values for the residence time in the second mixer 140 include values in the range of 1 to 100 minutes; alternatively, from 1 to 10 minutes; alternatively, from 1 to 8 minutes; alternatively, from 2 to 6 minutes. Suitable values for the residence time in the second mixer 220 include values in the range of 0.1 to 10 minutes; alternatively, from 1 to 8 minutes; alternatively, from 2 to 6 minutes.

Also disclosed herein are processes for pre-polymerizing propylene.

One process for pre-polymerizing propylene can include adding a catalyst and a hydrocarbon (e.g., propylene or the saturated hydrocarbon described herein) to the first mixer 130; mixing the catalyst and the hydrocarbon in the first mixer 130 to form a first catalyst suspension comprising the catalyst and the hydrocarbon; flowing the first catalyst suspension from the first mixer 130 to a second mixer 140 or 220; adding a co-catalyst and optionally an electron donor agent to the first catalyst suspension in or upstream of the second mixer 140 or 220; pre-polymerizing propylene in the second mixer 140 or 220 to form a second catalyst suspension comprising the hydrocarbon and catalyst particles coated with polypropylene; and feeding the second catalyst suspension to a polymerization reactor 170 or to a storage tank 180. In aspects where the second catalyst suspension is fed to the storage tank 180, the process can further include flowing the second catalyst suspension from the storage tank 180 to the polymerization reactor 170. In aspects of the process where the hydrocarbon is propylene, the second mixer can be the second mixer 140 embodied as a stirred tank or the second mixer 220 embodied as a static mixer. In aspects of the process where the hydrocarbon comprises propane, n-butane, mixed butanes (a mixture of isobutane with other butanes), or a combination thereof, the second mixer can be the second mixer 140 embodied as a stirred tank or the second mixer 220 embodied as a static mixer. The process can be performed on a continuous basis or a batch basis.

Another process is a continuous pre-polymerization process with reference to FIG. 1. The process can include adding a catalyst and propylene to the first mixer 130, mixing the catalyst and the hydrocarbon in the first mixer 130 to form a first catalyst suspension comprising the catalyst and propylene; flowing the first catalyst suspension from the first mixer 130 to a second mixer 140, wherein the second mixer 140 is a stirred tank; adding a co-catalyst and optionally an electron donor agent to the first catalyst suspension in the second mixer 140; pre-polymerizing propylene in the second mixer 140 to form a second catalyst suspension comprising propylene, catalyst particles coated with polypropylene, co-catalyst, and optionally the electron donor agent; and feeding the second catalyst suspension to a polymerization reactor 170. In aspects, the catalyst particles in propylene, the co-catalyst, and the optional electron donor agent are each added via separate inlets 141, 142, and 143 of the second mixer 140; alternatively, any of the lines containing the catalyst particles in propylene, the co-catalyst, and the optional electron donor agent can be combined prior to being introduced to the second mixer 140, and the combined line can be connected to the respective inlet.

Another process is a continuous pre-polymerization process with reference to FIG. 2. The process can include adding a catalyst and propylene to the first mixer 130; mixing the catalyst and propylene in the first mixer 130 to form a first catalyst suspension comprising the catalyst and propylene; flowing the first catalyst suspension from the first mixer 130 to a second mixer 220, wherein the second mixer 220 is a static mixer; adding a co-catalyst and optionally an electron donor agent to the first catalyst suspension upstream of the second mixer 220; pre-polymerizing propylene in the second mixer 220 to form a second catalyst suspension (e.g., a pre-polymerized catalyst suspension) comprising propylene, catalyst particles coated with polypropylene, co-catalyst, and optionally the electron donor agent; and feeding the second catalyst suspension to a polymerization reactor 170. In aspects, only the co-catalyst is added to the first catalyst suspension; alternatively, both the co-catalyst and the electron donor agent are added to the first catalyst suspension. In one aspect, the co-catalyst is added to the first catalyst suspension at a location in a transfer line that is upstream of the location where the electron donor agent is added. In another aspect, the electron donor agent is added to the first catalyst suspension at a location in a transfer line that is upstream of the location where the co-catalyst is added.

Another process is a continuous pre-polymerization process with reference to FIG. 3. The process can include adding a catalyst and a first amount of a saturated hydrocarbon to the first mixer 130; mixing the catalyst and the first amount of the saturated hydrocarbon in the first mixer 130 to form a first catalyst suspension comprising the catalyst and the hydrocarbon; flowing the first catalyst suspension from the first mixer 130 to a second mixer 220, wherein the second mixer 220 is a static mixer; adding a co-catalyst, propylene, and optionally an electron donor agent to the first catalyst suspension upstream of the second mixer 220; pre-polymerizing propylene in the second mixer 220 to form a second catalyst suspension (e.g., a pre-polymerized catalyst suspension) comprising propylene, the saturated hydrocarbon catalyst particles coated with polypropylene, co-catalyst, and optionally the electron donor agent; and feeding the second catalyst suspension to a polymerization reactor 170. In aspects, a second amount of the saturated hydrocarbon is combined with the first catalyst suspension downstream of the outlet 133 of the first mixer 130 and upstream of the location were additional components are added to the first catalyst suspension. In aspects, only the co-catalyst and propylene are added to the first catalyst suspension; alternatively, the co-catalyst, propylene, and the electron donor agent are added to the first catalyst suspension. In one aspect, the co-catalyst is added to the first catalyst suspension at a location in a transfer line that is upstream of the location where the electron donor agent is added and where the propylene is added. In another aspect, the electron donor agent is added to the first catalyst suspension at a location in a transfer line that is upstream of the location where the co-catalyst is added and where the propylene is added.

Another process is a continuous pre-polymerization process with reference to FIG. 4. The process can include adding a catalyst and a first amount of a saturated hydrocarbon to the first mixer 130; mixing the catalyst and the first amount of the saturated hydrocarbon in the first mixer 130 to form a first catalyst suspension comprising the catalyst and the hydrocarbon; flowing the first catalyst suspension from the first mixer 130 to a second mixer 140, wherein the second mixer 140 is a stirred tank; adding propylene to the first catalyst suspension; adding a co-catalyst and optionally the electron donor agent to the first catalyst suspension in the second mixer 140; pre-polymerizing propylene in the second mixer 140 to form a second catalyst suspension comprising propylene, the saturated hydrocarbon, catalyst particles coated with polypropylene, co-catalyst, and optionally the electron donor agent; and feeding the second catalyst suspension to a polymerization reactor 170. In aspects, the catalyst particles in the saturated hydrocarbon, the co-catalyst, and the optional electron donor agent are each added via separate inlets 141, 142, and 143 of the second mixer 140; alternatively, any of the lines containing the catalyst particles in the saturated hydrocarbon, the co-catalyst, and the optional electron donor agent can be combined prior to being introduced to the second mixer 140, and the combined line can be connected to the respective inlet. In aspects, propylene can be added to the first catalyst suspension in a transfer line upstream of the second mixer 140, via a feed line for the co-catalyst, via a feed line for the optional electron donor agent, or via an additional inlet of the second mixer 140 (dashed lines in FIG. 4).

Another process is a batch pre-polymerization process with reference to FIG. 5. The process can include adding a catalyst and propylene to the first mixer 130, mixing the catalyst and the hydrocarbon in the first mixer 130 to form a first catalyst suspension comprising the catalyst and propylene; flowing the first catalyst suspension from the first mixer 130 to a second mixer 140, wherein the second mixer 140 is a stirred tank; adding a co-catalyst and optionally an electron donor agent to the first catalyst suspension in the second mixer 140; pre-polymerizing propylene in the second mixer 140 to form a second catalyst suspension comprising propylene, catalyst particles coated with polypropylene, co-catalyst, and optionally the electron donor agent; and flowing the second catalyst suspension to a storage tank 180. In some aspects, the process can additionally include flowing the second catalyst suspension from the storage tank 180 to a polymerization reactor 170. In aspects, the catalyst particles in propylene, the co-catalyst, and the optional electron donor agent are each added to the second mixer 140 via separate inlets 141, 142, and 143; alternatively, any of the lines containing the catalyst particles in propylene, the co-catalyst, and the optional electron donor agent can be combined prior to being introduced to the second mixer 140, and the combined line can be connected to the respective inlet.

Another process is a batch pre-polymerization process with reference to FIG. 6. The process can include adding a catalyst and propylene to the first mixer 130; mixing the catalyst and propylene in the first mixer 130 to form a first catalyst suspension comprising the catalyst and the propylene; flowing the first catalyst suspension from the first mixer 130 to a second mixer 220, wherein the second mixer 220 is a static mixer; adding a co-catalyst and optionally an electron donor agent to the first catalyst suspension upstream of the second mixer 220; pre-polymerizing propylene in the second mixer 220 to form a second catalyst suspension (e.g., a pre-polymerized catalyst suspension) comprising propylene, catalyst particles coated with polypropylene, co-catalyst, and optionally the electron donor agent; and flowing the second catalyst suspension to a storage tank 180. In some aspects, the process can additionally include flowing the second catalyst suspension from the storage tank 180 to a polymerization reactor 170. In aspects, only the co-catalyst is added to the first catalyst suspension; alternatively, both the co-catalyst and the electron donor agent are added to the first catalyst suspension. In one aspect, the co-catalyst is added to the first catalyst suspension at a location in a transfer line that is upstream of the location where the electron donor agent is added. In another aspect, the electron donor agent is added to the first catalyst suspension at a location in a transfer line that is upstream of the location where the co-catalyst is added.

Another process is a batch pre-polymerization process with reference to FIG. 7. The process can include adding a catalyst and a first amount of a saturated hydrocarbon to the first mixer 130; mixing the catalyst and the first amount of the saturated hydrocarbon in the first mixer 130 to form a first catalyst suspension comprising the catalyst and the hydrocarbon; flowing the first catalyst suspension from the first mixer 130 to a second mixer 220, wherein the second mixer 220 is a static mixer; adding a co-catalyst, propylene, and optionally an electron donor agent to the first catalyst suspension upstream of the second mixer 220; pre-polymerizing propylene in the second mixer 220 to form a second catalyst suspension (e.g., a pre-polymerized catalyst suspension) comprising propylene, the saturated hydrocarbon catalyst particles coated with polypropylene, co-catalyst, and optionally the electron donor agent; flowing the second catalyst suspension to a storage tank 180. In some aspects, the process can additionally include flowing the second catalyst suspension from the storage tank 180 to a polymerization reactor 170. In aspects, a second amount of the saturated hydrocarbon is combined with the first catalyst suspension downstream of the outlet 133 of the first mixer 130 and upstream of the location were additional components are added to the first catalyst suspension. In aspects, only the co-catalyst and propylene are added to the first catalyst suspension; alternatively, the co-catalyst, propylene, and the electron donor agent are added to the first catalyst suspension. In one aspect, the co-catalyst is added to the first catalyst suspension at a location in a transfer line that is upstream of the location where the electron donor agent is added and where the propylene is added. In another aspect, the electron donor agent is added to the first catalyst suspension at a location in a transfer line that is upstream of the location where the co-catalyst is added and where the propylene is added.

Another process is a batch pre-polymerization process with reference to FIG. 8. The process can include adding a catalyst and a first amount of a saturated hydrocarbon to the first mixer 130; mixing the catalyst and the first amount of the saturated hydrocarbon in the first mixer 130 to form a first catalyst suspension comprising the catalyst and the hydrocarbon; flowing the first catalyst suspension from the first mixer 130 to a second mixer 140, wherein the second mixer 140 is a stirred tank; adding propylene to the first catalyst suspension; adding a co-catalyst and optionally the electron donor agent to the first catalyst suspension in the second mixer 140; pre-polymerizing propylene in the second mixer 140 to form a second catalyst suspension comprising propylene, the saturated hydrocarbon, catalyst particles coated with polypropylene, co-catalyst, and optionally the electron donor agent; and flowing the second catalyst suspension to a storage tank 180. In some aspects, the process can additionally include flowing the second catalyst suspension from the storage tank 180 to a polymerization reactor 170. In aspects, the catalyst particles in the saturated hydrocarbon, the co-catalyst, and the optional electron donor agent are each added via separate inlets 141, 142, and 143 of the second mixer 140; alternatively, any of the lines containing the catalyst particles in the saturated hydrocarbon, the co-catalyst, and the optional electron donor agent can be combined prior to being introduced to the second mixer 140, and the combined line can be connected to the respective inlet. In aspects, propylene can be added to the first catalyst suspension in a transfer line upstream of the second mixer 140, via a feed line for the co-catalyst, via a feed line for the optional electron donor agent, or via an additional inlet of the second mixer 140.

EXAMPLES

Aspects of the invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Example 1

Example 1 is a pre-polymerization performed with the system 300 illustrated in FIG. 3. For Example 1, dry catalyst was introduced from the hopper 120 into the first mixer 130 via line 303 at a rate of 8 lb/hr (8.63 kg/hr). Propane used as the saturated hydrocarbon was introduced via line 301b into the first mixer 130 at a rate of 200 lb/hr (90.72 kg/hr), such that the concentration of catalyst particles in the first mixer 130 was 4 wt % based on a weight of propane in the first mixer 130 (i.e., the concentration of catalyst particles in the first catalyst suspension was 4 wt % based on the weight of propane in the first catalyst suspension). The catalyst suspension was mixed in the first mixer 130, which was controlled at a temperature of 5° C.

The first catalyst suspension was removed from the first mixer 130 via line 305 and mixed with propane from line 307. Propane flow in line 307 was 1,800 lb/hr (816.47 kg/hr). The total flow of propane in line 309 was thus 2,000 lb/hr (907.19 kg/hr) propane, and the total flow of catalyst particles in line 309 was 8 lb/hr (3.63 kg/hr) catalyst. Triethylaluminum was fed into the first catalyst suspension as the co-catalyst via line 107 at a rate of 1 lb/hr (0.45 kg/hr). Proprietary electron donor agent was fed into the first catalyst suspension via line 109 at a rate of 0.08 lb/hr (0.036 kg/hr). Propylene was fed into the first catalyst suspension via line 101 at a rate of 40 lb/hr (18/14 kg/hr).

The first catalyst suspension containing propane, catalyst particles, triethylaluminum, proprietary electron donor, and propylene was introduced to static mixer 220. The static mixer 220 was controlled to a temperature of 15° C. using refrigerant in cooling jackets 225.

The pre-polymerized catalyst suspension flowed from the static mixer 220 in line 319 to a polymerization reactor 170, where polypropylene was produced at polymerization conditions that included a productivity of 25,000 lb polypropylene/lb catalyst, and the liquid in the reaction medium in the reactor contained 1 wt % propane and 99 wt % propylene. The polymerization reactor 170 had a volume of 70,000 gallons (265 m$^3$), with 204,000 lb (92,532.8 kg) propylene circulating therein.

Lines 311, 313, 315, and 317 (the transfer line in Example 1) had a diameter of 0.5 in (1.27 cm).

Additional Disclosure

The following is provided as additional disclosure for combinations of features and aspects of the present invention.

Aspect 1 is a process for pre-polymerizing propylene comprising adding a catalyst and a hydrocarbon to a first mixer, mixing the catalyst and the hydrocarbon in the first mixer to form a first catalyst suspension comprising the catalyst and the hydrocarbon, flowing the first catalyst suspension from the first mixer to a second mixer, adding a co-catalyst and an optional electron donor agent to the first catalyst suspension in or upstream of the second mixer, pre-polymerizing propylene in the second mixer to form a second catalyst suspension comprising the hydrocarbon and catalyst particles coated with polypropylene, and flowing the second catalyst suspension to a polymerization reactor or to a storage tank.

Aspect 2 is the process of Aspect 1, wherein the hydrocarbon is propylene.

Aspect 3 is the process of Aspect 2, wherein the second mixer is a stirred tank or a static mixer; and wherein the second catalyst suspension comprises i) catalyst particles coated with polypropylene, and ii) propylene.

Aspect 4 is the process of any of Aspects 1 to 3, wherein the hydrocarbon comprises propane, n-butane, mixed butanes, or a combination thereof.

Aspect 5 is the process of Aspect 4, wherein the second mixer is a static mixer; wherein the co-catalyst and the optional electron donor agent are added to the first catalyst suspension upstream of the static mixer; and wherein the process further comprises adding propylene to the first catalyst suspension upstream of the static mixer, wherein the second catalyst suspension comprises i) catalyst particles coated with polypropylene, ii) the hydrocarbon, and iii) propylene.

Aspect 6 is the process of any of Aspects 4 to 5, wherein the second mixer is a stirred tank; wherein the co-catalyst and the optional electron donor agent are added to the first catalyst suspension in the stirred tank; and wherein the process further comprises adding propylene to the first catalyst suspension upstream of or in the stirred tank, wherein the second catalyst suspension comprises i) catalyst particles coated with polypropylene, ii) the hydrocarbon, and iii) propylene.

Aspect 7 is the process of any of Aspects 4 to 6, further comprising adding an additional amount of the hydrocarbon to the first catalyst suspension before adding the co-catalyst and the optional electron donor agent to the first catalyst suspension.

Aspect 8 is the process of any of Aspects 1 to 7, wherein flowing the second catalyst suspension to a polymerization reactor or to a storage tank comprises flowing the second catalyst suspension to the storage tank before feeding the second catalyst suspension to the polymerization reactor.

Aspect 9 is the process of any of Aspects 1 to 8, wherein the pre-polymerizing is performed on a continuous basis; and wherein flowing the second catalyst suspension to a polymerization reactor or to a storage tank comprises flowing the second catalyst suspension to the polymerization reactor.

Aspect 10 is the process of any of Aspects 1 to 9, wherein the catalyst is a Ziegler-Natta catalyst or a metallocene catalyst.

Aspect 11 is a pre-polymerization system comprising a first feed line comprising a catalyst, a first mixer having a first inlet connected to the first feed line, a first transfer line containing a first catalyst suspension and having an end connected to an outlet of the first mixer, a second mixer having an inlet connected to an opposite end of the first transfer line, wherein the second mixer is configured to pre-polymerize propylene in a presence of the catalyst to produce a coating of polypropylene on catalyst particles received from the first transfer line, a second feed line comprising a co-catalyst, wherein the second feed line is connected to the first transfer line or to a second inlet of the second mixer, an optional third feed line comprising an electron donor agent, wherein the optional third feed line is connected to the first transfer line or to a third inlet of the second mixer, a second transfer line having an end connected to an outlet of the second mixer, and a polymerization reactor coupled to an opposite end of the second transfer line, wherein the polymerization reactor is configured to polymerize propylene in a presence of the catalyst particles having the coating of polypropylene to produce a product polypropylene.

Aspect 12 is the pre-polymerization system of Aspect 11, further comprising a fourth feed line comprising propylene, wherein the fourth feed line is connected to a second inlet of the first mixer.

Aspect 13 is the pre-polymerization system of Aspect 12, wherein the second mixer is a stirred tank or a static mixer.

Aspect 14 is the pre-polymerization system of any of Aspects 11 to 13, wherein the first feed line further comprises propane, n-butane, mixed butanes, or a combination thereof.

Aspect 15 is the pre-polymerization system of Aspect 14, wherein the second mixer is a static mixer, the pre-polymerization system further comprising a fifth feed line comprising propylene, wherein the fifth feed line is connected to the first transfer line upstream of the static mixer and downstream of the location where the second feed line connects to the first transfer line.

Aspect 16 is the pre-polymerization system of Aspect 15, further comprising a sixth feed line comprising propane, n-butane, mixed butanes, or a combination thereof, wherein the sixth feed line is connected to the first transfer line upstream of the location where the second feed line connects to the first transfer line and downstream of the outlet of the first mixer.

Aspect 17 is the pre-polymerization system of Aspect 14, wherein the second mixer is a stirred tank, the pre-polymerization system further comprising a fifth feed line comprising propylene, wherein the fifth feed line is connected to the first transfer line or to the stirred tank.

Aspect 18 is the pre-polymerization system of Aspect 17, further comprising a sixth feed line comprising propane, n-butane, mixed butanes, or a combination thereof, wherein the sixth feed line is connected to the first transfer line upstream of the location where the second feed line connects to the first transfer line and downstream of the outlet of the first mixer.

Aspect 19 is the pre-polymerization system of any of Aspects 11 to 18, further comprising a storage tank having an inlet connected to the opposite end of the second transfer line and an outlet connected to an inlet of the polymerization reactor.

Aspect 20 is the pre-polymerization system of any of Aspects 11 to 19, wherein the catalyst is a Ziegler-Natta catalyst or a metallocene catalyst.

Aspect 21 is a pre-polymerization system comprising a first feed line comprising propylene, a second feed line comprising a catalyst, a first mixer having a first inlet connected to the first feed line and a second inlet connected to the second feed line, a first transfer line containing a first catalyst suspension and having an end connected to an outlet of the first mixer, a second mixer having a first inlet connected to an opposite end of the first transfer line, wherein the second mixer is configured to pre-polymerize propylene in the presence of the catalyst to produce a coating of polypropylene on catalyst particles received from the first transfer line, a third feed line comprising a co-catalyst, wherein the third feed line is connected to the first transfer line or to a second inlet of the second mixer, a second transfer line having an end connected to an outlet of the second mixer, and a polymerization reactor coupled to an opposite end of the second transfer line, wherein the polymerization reactor is configured to polymerize propylene in the presence of the catalyst particles having the coating of polypropylene to produce a product polypropylene.

Aspect 22 is the pre-polymerization system of Aspect 21, wherein the second mixer is a stirred tank.

Aspect 23 is the pre-polymerization system of any of Aspects 21 to 22, wherein the second mixer is a static mixer.

Aspect 24 is the pre-polymerization system of any of Aspects 21 to 23, further comprising a storage tank having an inlet connected to the opposite end of the second transfer line and an outlet connected to an inlet of the polymerization reactor.

Aspect 25 is the pre-polymerization system of any of Aspects 21 to 24, further comprising a fourth feed line comprising an electron donor agent, wherein the fourth feed line is connected to the first transfer line or to a third inlet of the second mixer.

Aspect 26 is a pre-polymerization system comprising a first feed line comprising a hydrocarbon and a catalyst, a first mixer having a first inlet connected to the first feed line, a first transfer line containing a first catalyst suspension and having an end connected to an outlet of the first mixer, a second feed line comprising a co-catalyst, wherein the second feed line is connected to the first transfer line, a third feed line comprising propylene, wherein the third feed line is connected to the first transfer line downstream of the location where the third feed line connects to the first transfer line, an optional fourth feed line comprising an electron donor agent, wherein the optional fourth feed line is connected to the first transfer line or to a third inlet of the second mixer, a second mixer having a first inlet connected to an opposite end of the first transfer line downstream of the location where the third feed line connects to the first transfer line, wherein the second mixer is configured to pre-polymerize propylene in the presence of the catalyst to form a coating of polypropylene on catalyst particles received from the first transfer line, a second transfer line having an end connected to an outlet of the second mixer, and a polymerization reactor coupled to an opposite end of the second transfer line, wherein the polymerization reactor is configured to polymerize propylene in the presence of the catalyst particles having the coating of polypropylene to produce a product polypropylene.

Aspect 27 is the pre-polymerization system of Aspect 26, wherein the hydrocarbon comprises propane.

Aspect 28 is the pre-polymerization system of any of Aspects 26 to 27, wherein the second mixer is a static mixer.

Aspect 29 is the pre-polymerization system of any of Aspects 26 to 28, further comprising a fifth feed line comprising propane, wherein the fifth feed line is connected the first transfer line upstream of the location where the second feed line connects to the first transfer line and downstream of the outlet of the first mixer.

Aspect 30 is the pre-polymerization system of any of Aspects 26 to 29, further comprising a storage tank having an inlet connected to the opposite end of the second transfer line and an outlet connected to an inlet of the polymerization reactor.

While aspects and embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s), and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A process for pre-polymerizing propylene comprising:
   adding a catalyst and a hydrocarbon comprising propane, n-butane, mixed butanes, or a combination thereof to a first mixer;
   mixing the catalyst and the hydrocarbon in the first mixer to form a first catalyst suspension comprising the catalyst and the hydrocarbon;
   flowing the first catalyst suspension from the first mixer to a second mixer;
   adding propylene, a co-catalyst and an optional electron donor agent to the first catalyst suspension in or upstream of the second mixer;
   pre-polymerizing propylene in the second mixer to form a second catalyst suspension comprising the hydrocarbon and catalyst particles coated with polypropylene; and
   flowing the second catalyst suspension to a polymerization reactor or to a storage tank.

2. The process of claim 1, wherein the second mixer is a stirred tank or a static mixer; and wherein the second catalyst suspension comprises i) catalyst particles coated with polypropylene, and ii) propylene.

3. The process of claim 1, wherein the second mixer is a static mixer; wherein the co-catalyst and the optional electron donor agent are added to the first catalyst suspension upstream of the static mixer; and wherein the process further comprises:
   adding propylene to the first catalyst suspension upstream of the static mixer;
   wherein the second catalyst suspension comprises i) catalyst particles coated with polypropylene, ii) the hydrocarbon, and iii) propylene.

4. The process of claim 1, wherein the second mixer is a stirred tank; wherein the co-catalyst and the optional electron donor agent are added to the first catalyst suspension in the stirred tank; and wherein the process further comprises:
   adding propylene to the first catalyst suspension upstream of or in the stirred tank;
   wherein the second catalyst suspension comprises i) catalyst particles coated with polypropylene, ii) the hydrocarbon, and iii) propylene.

5. The process of claim 1, further comprising:
   adding an additional amount of the hydrocarbon to the first catalyst suspension before adding the co-catalyst and the optional electron donor agent to the first catalyst suspension.

6. A process for pre-polymerizing propylene comprising:
   adding a catalyst and a hydrocarbon to a first mixer;
   mixing the catalyst and the hydrocarbon in the first mixer to form a first catalyst suspension comprising the catalyst and the hydrocarbon;
   flowing the first catalyst suspension from the first mixer to a second mixer;
   adding propylene, a co-catalyst and an optional electron donor agent to the first catalyst suspension in or upstream of the second mixer;
   pre-polymerizing propylene in the second mixer to form a second catalyst suspension comprising the hydrocarbon and catalyst particles coated with polypropylene; and
   flowing the second catalyst suspension to a polymerization reactor or to a storage tank,
   wherein flowing the second catalyst suspension to a polymerization reactor or to a storage tank comprises:
   flowing the second catalyst suspension to the storage tank before feeding the second catalyst suspension to the polymerization reactor.

7. The process of claim 1, wherein the pre-polymerizing is performed on a continuous basis; and wherein flowing the second catalyst suspension to a polymerization reactor or to a storage tank comprises flowing the second catalyst suspension to the polymerization reactor.

8. The process of claim 1, wherein the catalyst is a Ziegler-Natta catalyst or a metallocene catalyst.

9. A pre-polymerization system comprising:
   a first feed line comprising a catalyst;
   a first mixer having a first inlet connected to the first feed line;
   a first transfer line containing a first catalyst suspension and having an end connected to an outlet of the first mixer;
   a second mixer having an inlet connected to an opposite end of the first transfer line, wherein the second mixer is configured to pre-polymerize propylene in a presence of the catalyst to produce a coating of polypropylene on catalyst particles received from the first transfer line;
   a second feed line comprising a co-catalyst, wherein the second feed line is connected to the first transfer line or to a second inlet of the second mixer;
   an optional third feed line comprising an electron donor agent, wherein the optional third feed line is connected to the first transfer line or to a third inlet of the second mixer;
   a second transfer line having an end connected to an outlet of the second mixer; and
   a polymerization reactor coupled to an opposite end of the second transfer line, wherein the polymerization reactor is configured to polymerize propylene in a presence of the catalyst particles having the coating of polypropylene to produce a product polypropylene.

10. The pre-polymerization system of claim 9, further comprising a fourth feed line comprising propylene, wherein the fourth feed line is connected to a second inlet of the first mixer.

11. The pre-polymerization system of claim 10, wherein the second mixer is a stirred tank or a static mixer.

12. The pre-polymerization system of claim 9, wherein the first feed line further comprises propane, n-butane, mixed butanes, or a combination thereof.

13. The pre-polymerization system of claim 12, wherein the second mixer is a static mixer, the pre-polymerization system further comprising:
   a fifth feed line comprising propylene, wherein the fifth feed line is connected to the first transfer line upstream of the static mixer and downstream of the location where the second feed line connects to the first transfer line.

14. The pre-polymerization system of claim 13, further comprising:
- a sixth feed line comprising propane, n-butane, mixed butanes, or a combination thereof;
- wherein the sixth feed line is connected to the first transfer line upstream of the location where the second feed line connects to the first transfer line and downstream of the outlet of the first mixer.

15. The pre-polymerization system of claim 12, wherein the second mixer is a stirred tank, the pre-polymerization system further comprising:
- a fifth feed line comprising propylene, wherein the fifth feed line is connected to the first transfer line or to the stirred tank.

16. The pre-polymerization system of claim 15, further comprising:
- a sixth feed line comprising propane, n-butane, mixed butanes, or a combination thereof;
- wherein the sixth feed line is connected to the first transfer line upstream of the location where the second feed line connects to the first transfer line and downstream of the outlet of the first mixer.

17. The pre-polymerization system of claim 9, further comprising:
- a storage tank having an inlet connected to the opposite end of the second transfer line and an outlet connected to an inlet of the polymerization reactor.

18. The pre-polymerization system of claim 9, wherein the catalyst is a Ziegler-Natta catalyst or a metallocene catalyst.

19. The process of claim 6, wherein the second mixer is a static mixer; wherein the co-catalyst and the optional electron donor agent are added to the first catalyst suspension upstream of the static mixer; and wherein the process further comprises:
- adding propylene to the first catalyst suspension upstream of the static mixer;

wherein the second catalyst suspension comprises i) catalyst particles coated with polypropylene, ii) the hydrocarbon, and iii) propylene.

20. The process of claim 6, wherein the second mixer is a stirred tank; wherein the co-catalyst and the optional electron donor agent are added to the first catalyst suspension in the stirred tank; and wherein the process further comprises:
- adding propylene to the first catalyst suspension upstream of or in the stirred tank;

wherein the second catalyst suspension comprises i) catalyst particles coated with polypropylene, ii) the hydrocarbon, and iii) propylene.

* * * * *